(12) United States Patent
Sasaki et al.

(10) Patent No.: US 8,576,674 B2
(45) Date of Patent: Nov. 5, 2013

(54) PLASMON GENERATOR INCLUDING TWO PORTIONS MADE OF DIFFERENT METALS

(75) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Kazuki Sato, Milpitas, CA (US); Yukinori Ikegawa, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 78 days.

(21) Appl. No.: 13/283,064

(22) Filed: Oct. 27, 2011

(65) Prior Publication Data

US 2013/0107681 A1    May 2, 2013

(51) Int. Cl.
*G11B 11/00* (2006.01)

(52) U.S. Cl.
USPC .................. 369/13.33; 369/13.13; 369/112.27

(58) Field of Classification Search
USPC .......... 369/13.33, 13.32, 13.24, 13.14, 13.03, 369/13.02, 13.12, 13.22, 13.01, 112.27; 360/125.31, 125.74

See application file for complete search history.

(56) References Cited

U.S. PATENT DOCUMENTS

| 7,330,404 | B2 | 2/2008 | Peng et al. |
| 8,014,101 | B2 | 9/2011 | Shimazawa et al. |
| 8,325,570 | B1 * | 12/2012 | Tanaka et al. ............... 369/13.33 |
| 2011/0170381 | A1 | 7/2011 | Matsumoto |

* cited by examiner

*Primary Examiner* — Ali Neyzari
(74) *Attorney, Agent, or Firm* — Oliff and Berridge, PLC

(57) ABSTRACT

A plasmon generator configured to excite a surface plasmon based on light includes a first portion formed of a first metal material and a second portion formed of a second metal material different from the first metal material. The plasmon generator has a front end face. The front end face includes a near-field light generating part that generates near-field light based on the surface plasmon. The second portion includes an end face located in the front end face. The second metal material satisfies at least one of the following requirements: a lower ionization tendency than that of the first metal material; a lower electrical conductivity than that of the first metal material; and a higher Vickers hardness than that of the first metal material.

14 Claims, 19 Drawing Sheets

PLASMON GENERATOR INCLUDING TWO PORTIONS MADE OF DIFFERENT METALS

BACKGROUND OF THE INVENTION

1. Field of the Invention

The present invention relates to a plasmon generator for use in thermally-assisted magnetic recording where a recording medium is irradiated with near-field light to lower the coercivity of the recording medium for data writing, and to a thermally-assisted magnetic recording head including the plasmon generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) for reading and a write head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

U.S. Pat. No. 7,330,404 discloses a technology in which the surface of the core of a waveguide and the surface of a plasmon generator are arranged to face each other with a gap therebetween, and evanescent light that occurs at the surface of the core based on the light propagating through the core is used to excite surface plasmons on the plasmon generator. Based on the excited surface plasmons, near-field light is produced.

The plasmon generator has a front end face located in the medium facing surface. The front end face includes a near-field light generating part which generates near-field light. The surface plasmons excited on the plasmon generator propagate along the surface of the plasmon generator to reach the near-field light generating part. As a result, the surface plasmons concentrate at the near-field light generating part, and the near-field light generating part generates near-field light based on the surface plasmons.

When a recording medium is irradiated with near-field light, an area having a higher temperature than its surroundings (this area will hereinafter be referred to as a heated spot) is formed in the recording medium. To increase the recording density, it is necessary to reduce the diameter of the heated spot.

A conventional plasmon generator is formed of a single material. The material is typically a metal having a high electrical conductivity, such as Ag, Au, Al, or Cu. However, the plasmon generator formed of a single material has the following three problems.

A first problem will be described first. The first problem relates to corrosion. More specifically, the front end face of the plasmon generator can be in contact with a high-temperature and high-humidity atmosphere. Therefore, if the plasmon generator is formed of a corrosion-prone material, the plasmon generator may be corroded. For example, if the plasmon generator is formed of Ag, Cu, or Al, the plasmon generator may be corroded because Ag, Cu, and Al are metals that are relatively easily oxidizable, i.e., prone to corrosion.

Next, a second problem will be described. The second problem relates to excitation and propagation of surface plasmons and to the diameter of the heated spot. To allow the plasmon generator to excite a large number of surface plasmons and to propagate the excited surface plasmons efficiently, it is preferable that the material forming the plasmon generator be high in electrical conductivity. However, if the plasmon generator is formed of a single material having a high electrical conductivity, there arises a problem that the near-field light generated from the near-field light generating part is excessively high in intensity to cause the heated spot to be large in diameter. On the other hand, if the plasmon generator is formed of a single material having a low electrical conductivity, there arises a problem that the plasmon generator cannot excite a sufficient number of surface plasmons and the excited surface plasmons are significantly attenuated before they reach the near-field light generating part.

Next, a third problem will be described. The third problem relates to mechanical strength. More specifically, since the plasmon generator has the front end face located in the medium facing surface, it easily suffers mechanical damage such as deformation if its mechanical strength is low. For example, if the plasmon generator is formed of Ag, Au, Al, or Cu, the plasmon generator easily suffers mechanical damage because Ag, Au, Al, and Cu are relatively soft metals.

OBJECT AND SUMMARY OF THE INVENTION

It is an object of the present invention to provide a plasmon generator having features that cannot be achieved by a plasmon generator formed of a single material, and to provide a thermally-assisted magnetic recording head including such a plasmon generator.

A plasmon generator of the present invention is configured to excite a surface plasmon based on light. The plasmon generator includes a first portion formed of a first metal material and a second portion formed of a second metal material different from the first metal material.

The plasmon generator of the present invention may have a front end face. The front end face may include a near-field light generating part that generates near-field light based on the surface plasmon. The second portion may include an end face located in the front end face.

A thermally-assisted magnetic recording head of the present invention includes: a medium facing surface that faces a recording medium; a main pole that produces a write magnetic field for writing data on the recording medium; a waveguide; and a plasmon generator. The waveguide includes a core through which light propagates, and a cladding that surrounds the core. The plasmon generator is configured to excite a surface plasmon based on the light propagating through the core. The plasmon generator includes a first portion formed of a first metal material and a second portion formed of a second metal material different from the first metal material.

In the thermally-assisted magnetic recording head of the present invention, the plasmon generator may have a front end face located in the medium facing surface. The front end face may include a near-field light generating part that generates near-field light based on the surface plasmon. The second portion may include an end face located in the front end face.

In the plasmon generator and the thermally-assisted magnetic recording head of the present invention, the end face of the second portion located in the front end face may include the near-field light generating part. The first portion may be non-exposed in the front end face. In this case, the first portion may have a length of 150 to 200 nm in a direction perpendicular to the front end face, and the second portion may have a length of 2 to 80 nm in the direction perpendicular to the front end face.

In the plasmon generator and the thermally-assisted magnetic recording head of the present invention, where the second portion includes the end face located in the front end face, the first portion may be greater than the second portion in volume. The first metal material may be one of Ag, Au, Al, and Cu.

In the plasmon generator and the thermally-assisted magnetic recording head of the present invention, where the second portion includes the end face located in the front end face, the second metal material may have an ionization tendency lower than that of the first metal material. The second metal material may have an electrical conductivity lower than that of the first metal material. The second metal material may have a Vickers hardness higher than that of the first metal material.

According to the plasmon generator and the thermally-assisted magnetic recording head of the present invention, the plasmon generator includes a first portion formed of a first metal material and a second portion formed of a second metal material different from the first metal material. This allows the plasmon generator to provide features that cannot be achieved by a plasmon generator formed of a single material.

Other and further objects, features and advantages of the present invention will appear more fully from the following description.

DETAILED DESCRIPTION OF THE PREFERRED EMBODIMENTS

First Embodiment

Figure 5:
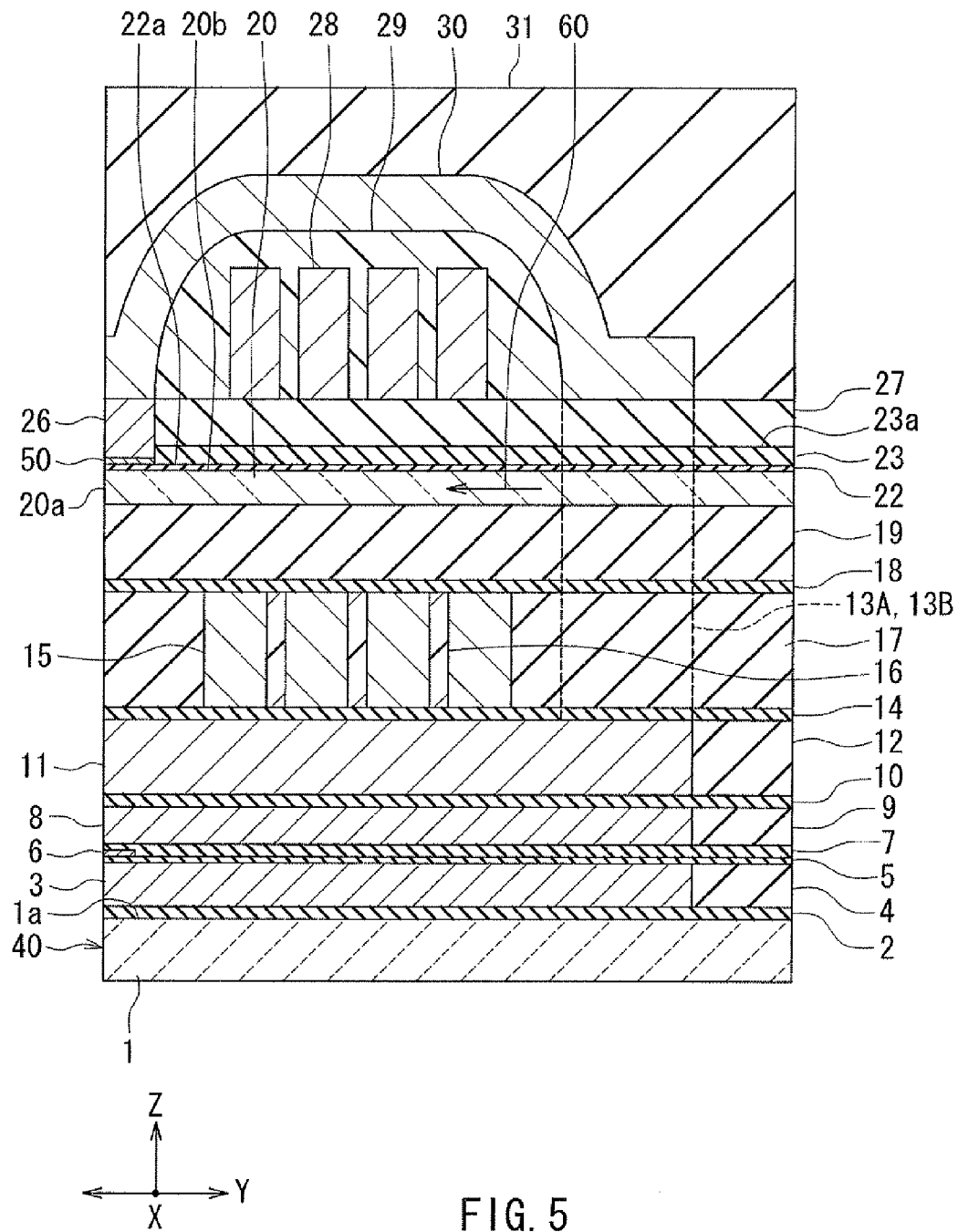
FIG. 5 is a cross-sectional view showing the configuration of the thermally-assisted magnetic recording head according to the first embodiment of the invention.
Figure 6:
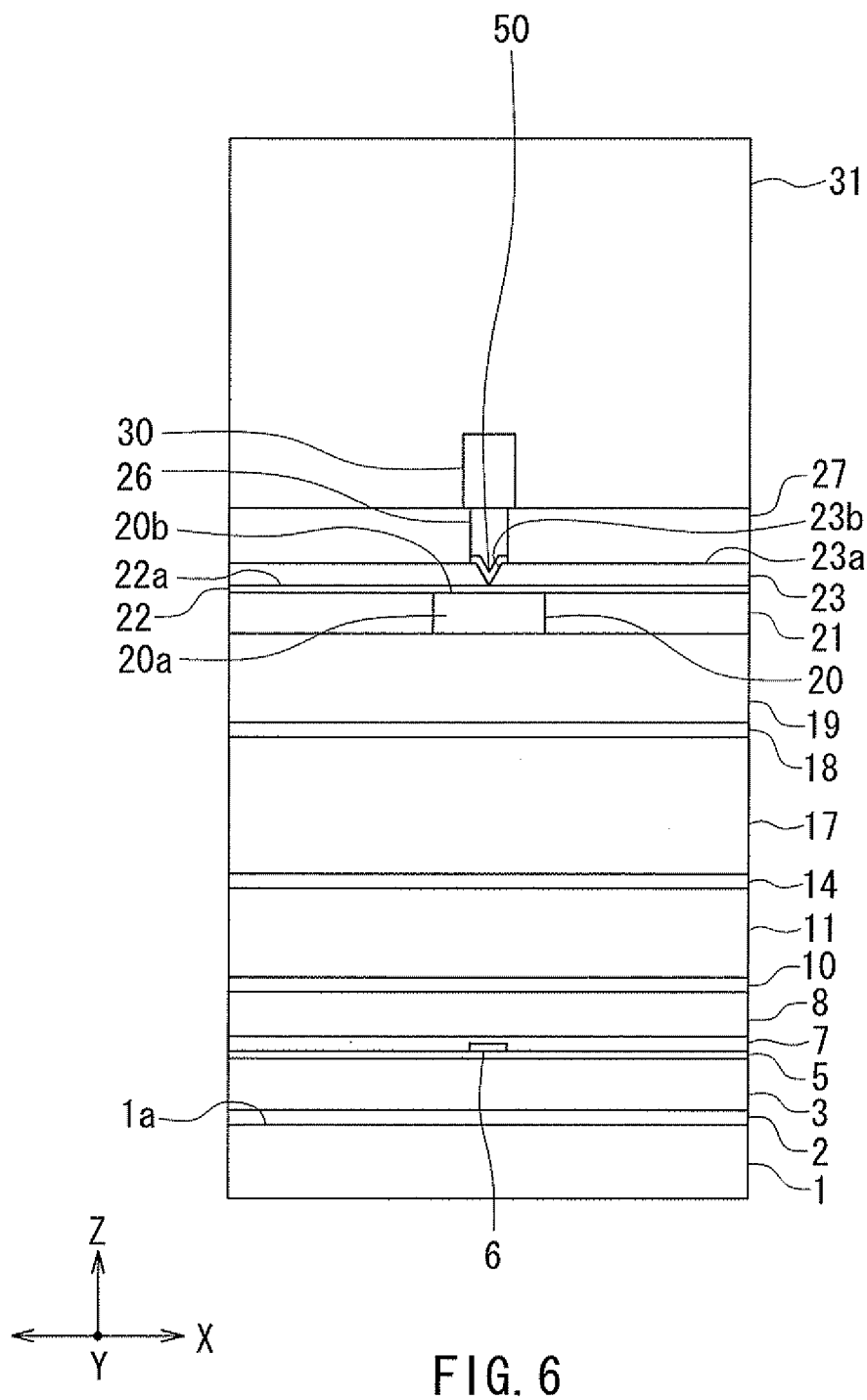
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe the configuration of a thermally-assisted magnetic recording head according to a first embodiment of the invention. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 40 that faces the recording medium. Here, X direction, Y direction, and Z direction will be defined as follows. The X direction is the direction across the tracks of the recording medium, i.e., the track width direction. The Y direction is a direction perpendicular to the medium facing surface 40. The Z direction is the direction of travel of the recording medium as viewed from the slider. The X, Y, and Z directions are orthogonal to one another.

As shown in FIG. 5 and FIG. 6, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; a bottom shield layer 3 made of a magnetic material and disposed on the insulating layer 2; and an insulating layer 4 disposed on the insulating layer 2 and surrounding the bottom shield layer 3. The insulating layers 2 and 4 are made of alumina ($Al_2O_3$), for example. The Z direction is also a direction perpendicular to the top surface 1a of the substrate 1.

The thermally-assisted magnetic recording head further includes: a bottom shield gap film 5 which is an insulating film disposed over the top surfaces of the bottom shield layer 3 and the insulating layer 4; a magnetoresistive (MR) element 6 serving as a read element disposed on the bottom shield gap film 5; two leads (not shown) connected to the MR element 6; and a top shield gap film 7 which is an insulating film disposed on the MR element 6.

An end of the MR element 6 is located in the medium facing surface 40 facing the recording medium. The MR element 6 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The thermally-assisted magnetic recording head further includes a top shield layer 8 made of a magnetic material and disposed on the top shield gap film 7, and an insulating layer 9 disposed on the top shield gap film 7 and surrounding the top shield layer 8. The insulating layer 9 is made of alumina, for example. The parts from the bottom shield layer 3 to the top shield layer 8 constitute a read head.

The thermally-assisted magnetic recording head further includes a nonmagnetic layer 10 made of a nonmagnetic material and disposed over the top shield layer 8 and the insulating layer 9, a return pole layer 11 made of a magnetic material and disposed on the nonmagnetic layer 10, and an insulating layer 12 disposed on the nonmagnetic layer 10 and surrounding the return pole layer 11. The return pole layer 11 has an end face located in the medium facing surface 40. The nonmagnetic layer 10 and the insulating layer 12 are made of alumina, for example.

The thermally-assisted magnetic recording head further includes two coupling portions 13A and 13B disposed away from the medium facing surface 40 and lying on part of the return pole layer 11, an insulating layer 14 disposed on another part of the return pole layer 11 and on the insulating layer 12, and a coil 15 disposed on the insulating layer 14. The coupling portions 13A and 13B are made of a magnetic material. Each of the coupling portions 13A and 13B has a first layer located on the return pole layer 11, and a second, a third, and a fourth layer stacked in this order on the first layer. The first layer of the coupling portion 13A and the first layer of the coupling portion 13B are arranged to align in the track width direction (the X direction). The coil 15 is planar spiral-shaped and wound around the first layers of the coupling portions 13A and 13B. The coil 15 is made of a conductive material such as copper. The insulating layer 14 is made of alumina, for example.

The thermally-assisted magnetic recording head further includes an insulating layer 16 disposed in the space between every adjacent turns of the coil 15, an insulating layer 17 disposed around the coil 15, and an insulating layer 18 disposed over the coil 15 and the insulating layers 16 and 17. The insulating layer 16 is made of photoresist, for example. The insulating layers 17 and 18 are made of alumina, for example. The first layers of the coupling portions 13A and 13B are embedded in the insulating layers 14 and 17.

The thermally-assisted magnetic recording head further includes a wave guide including a core 20 and a cladding. The cladding surrounds the core 20. The core 20 has an end face 20a closer to the medium facing surface 40, and a top surface 20b. The end face 20a may be located in the medium facing surface 40 or at a distance from the medium facing surface 40. FIG. 5 and FIG. 6 illustrate an example in which the end face 20a is located in the medium facing surface 40.

The cladding includes cladding layers 19 and 21, and a gap layer 22 having a top surface 22a. The cladding layer 19 is disposed on the insulating layer 18. The core 20 is disposed on the cladding layer 19. The cladding layer 21 is disposed on the cladding layer 19 and surrounds the core 20. The top surface 20b of the core 20 and the top surface of the cladding layer 21 are even with each other. The gap layer 22 is disposed over the top surface 20b of the core 20 and the top surface of the cladding layer 21.

The core 20 is made of a dielectric material that transmits laser light to be used for generating near-field light. The laser light emitted from a not-shown laser diode enters the core 20 and propagates through the core 20. The cladding layers 19 and 21 and the gap layer 22 are each made of a dielectric material that has a refractive index lower than that of the core 20. For example, the core 20 can be made of tantalum oxide such as $Ta_2O_5$ or silicon oxynitride (SiON), whereas the cladding layers 19 and 21 and the gap layer 22 can be made of silicon dioxide ($SiO_2$) or alumina.

The second layers of the coupling portions 13A and 13B are embedded in the insulating layer 18 and the cladding layer 19. The third layers of the coupling portions 13A and 13B are embedded in the cladding layer 21. The third layer of the coupling portion 13A and the third layer of the coupling portion 13B are located on opposite sides of the core 20 in the track width direction (the X direction) and are each spaced from the core 20.

The thermally-assisted magnetic recording head further includes a dielectric layer 23 disposed on the top surface 22a of the gap layer 22. The dielectric layer 23 has a top surface 23a, and a groove 23b that is located above the top surface 20b of the core 20 in the vicinity of the medium facing surface 40. The groove 23b is V-shaped in cross section parallel to the medium facing surface 40. The groove 23b has a bottom end located at a predetermined distance from the top surface 20b of the core 20 and extending in the direction perpendicular to the medium facing surface 40 (the Y direction). The dielectric layer 23 is made of a dielectric material different from the material used for the gap layer 22. If alumina is employed as the material for the gap layer 22, $SiO_2$ may be employed as the material for the dielectric layer 23, for example.

The thermally-assisted magnetic recording head further includes a plasmon generator 50 and a main pole 26. The plasmon generator 50 is disposed above the top surface 20b of the core 20 in the vicinity of the medium facing surface 40. The main pole 26 is made of a magnetic material and disposed such that the plasmon generator 50 is interposed between the core 20 and the main pole 26. The plasmon generator 50 is configured to excite surface plasmons based on laser light propagating through the core 20. At least part of the plasmon generator 50 is accommodated in the groove 23b of the dielectric layer 23. The plasmon generator 50 and the main pole 26 will be described in more detail later.

The thermally-assisted magnetic recording head further includes a dielectric layer 27 disposed on the dielectric layer 23 and surrounding the main pole 26. The fourth layers of the coupling portions 13A and 13B are embedded in the gap layer 22 and the dielectric layers 23 and 27. The top surfaces of the main pole 26, the dielectric layer 27, and the fourth layers of the coupling portions 13A and 13B are even with each other. The dielectric layer 27 is made of $SiO_2$, for example.

The thermally-assisted magnetic recording head further includes a coil 28 disposed on the dielectric layer 27, an insulating layer 29 disposed to cover the coil 28, and a yoke layer 30 made of a magnetic material and disposed over the main pole 26, the coupling portions 13A and 13B, the dielectric layer 27 and the insulating layer 29. The yoke layer 30 magnetically couples the main pole 26 to the coupling portions 13A and 13B. The coil 28 is planar spiral-shaped and wound around part of the yoke layer 30 lying on the coupling portions 13A and 13B. The coil 28 is made of a conductive material such as copper. The insulating layer 29 is made of photoresist, for example.

The thermally-assisted magnetic recording head further includes a protective layer 31 disposed to cover the yoke layer 30. The protective layer 31 is made of alumina, for example.

The parts from the return pole layer 11 to the yoke layer 30 constitute a write head. The coils 15 and 28 produce magnetic fields corresponding to data to be written on the recording medium. The return pole layer 11, the coupling portions 13A and 13B, the yoke layer 30, and the main pole 26 form a magnetic path for passing magnetic fluxes corresponding to the magnetic fields produced by the coils 15 and 28. The coils 15 and 28 are connected in series or in parallel so that the magnetic flux corresponding to the magnetic field produced by the coil 15 and the magnetic flux corresponding to the magnetic field produced by the coil 28 flow in the same direction through the main pole 26. The main pole 26 allows the magnetic flux corresponding to the magnetic field produced by the coil 15 and the magnetic flux corresponding to the magnetic field produced by the coil 28 to pass, and produces a write magnetic field for writing data on the recording medium by means of a perpendicular magnetic recording system.

As has been described, the thermally-assisted magnetic recording head according to the present embodiment includes the medium facing surface 40, the read head, and the write head. The medium facing surface 40 faces the recording medium. The read head and the write head are stacked on the substrate 1. Relative to the read head, the write head is located forward along the direction of travel of the recording medium (the Z direction) (i.e., located on the trailing side).

The read head includes: the MR element 6 serving as the read element; the bottom shield layer 3 and the top shield layer 8 for shielding the MR element 6, the bottom shield layer 3 and the top shield layer 8 having their respective portions that are located near the medium facing surface 40 and are opposed to each other with the MR element 6 therebetween; the bottom shield gap film 5 disposed between the MR element 6 and the bottom shield layer 3; and the top shield gap film 7 disposed between the MR element 6 and the top shield layer 8.

The write head includes the coils 15 and 28, the main pole 26, the waveguide, and the plasmon generator 50. The waveguide includes the core 20 through which light propagates, and the cladding surrounding the core 20. In the present embodiment, in particular, the core 20 allows laser light emitted from a not-shown laser diode to propagate through. The cladding includes the cladding layers 19 and 21 and the gap layer 22.

The core 20 has the top surface 20b. The gap layer 22 has the top surface 22a, and is disposed over the top surface 20b of the core 20 and the top surface of the cladding layer 21. At least part of the plasmon generator 50 is accommodated in the groove 23b of the dielectric layer 23 disposed on the top surface 22a of the gap layer 22.

Figure 1:
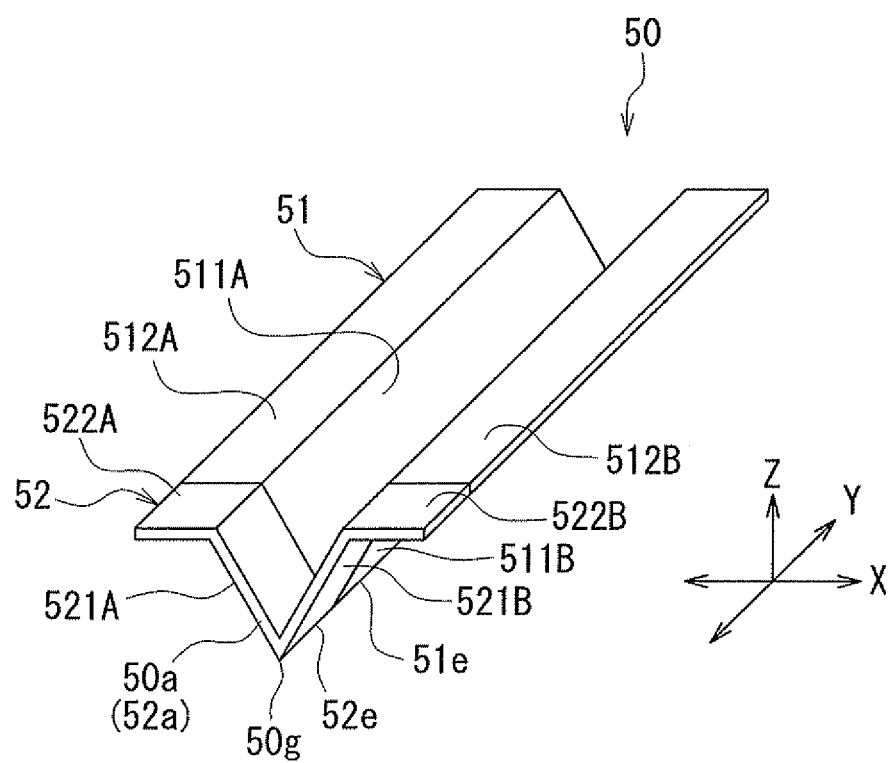
FIG. 1 is a perspective view showing a plasmon generator according to a first embodiment of the invention.
Figure 2:
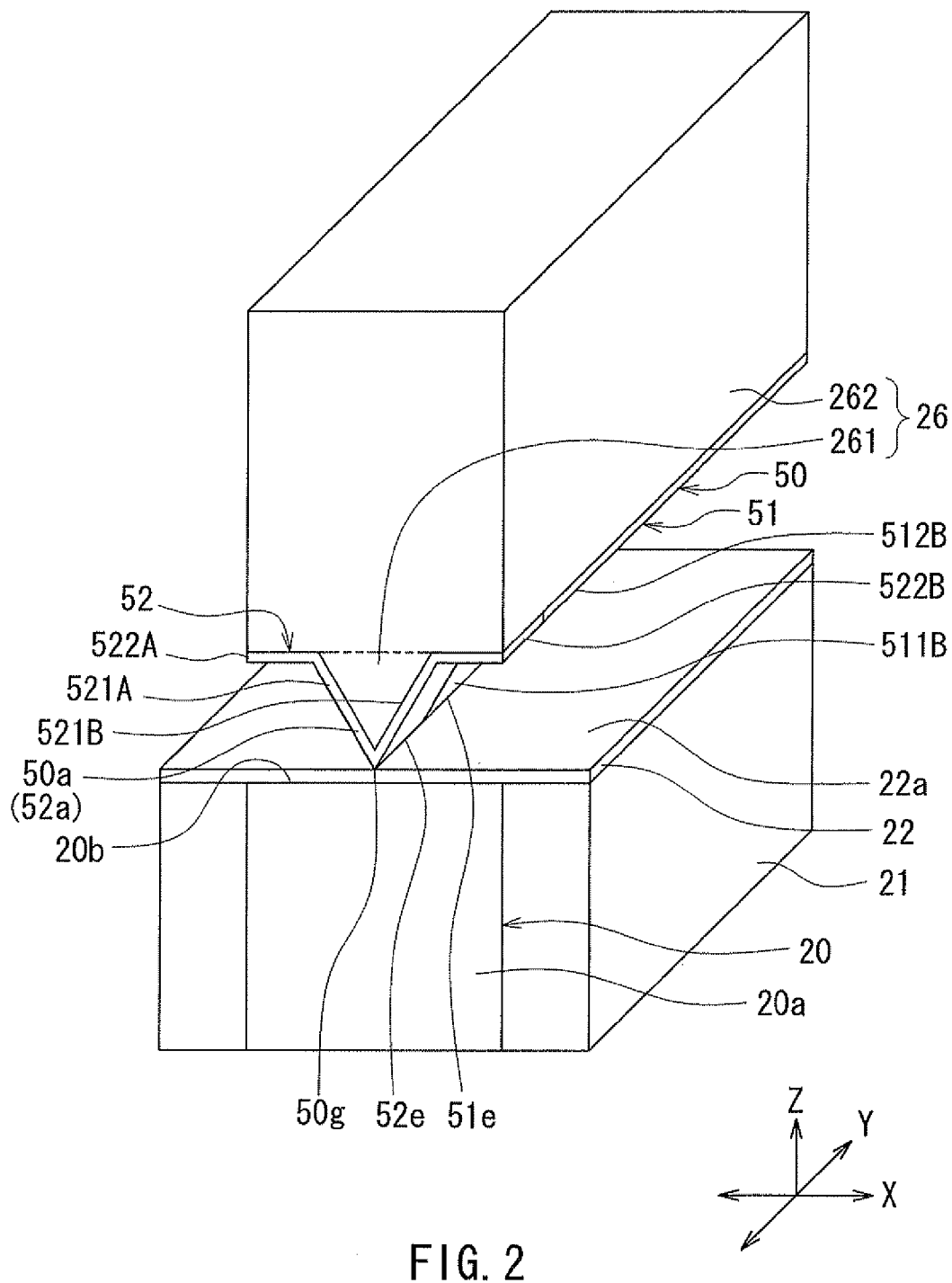
FIG. 2 is a perspective view showing the main part of a thermally-assisted magnetic recording head according to the first embodiment of the invention.
Figure 3:
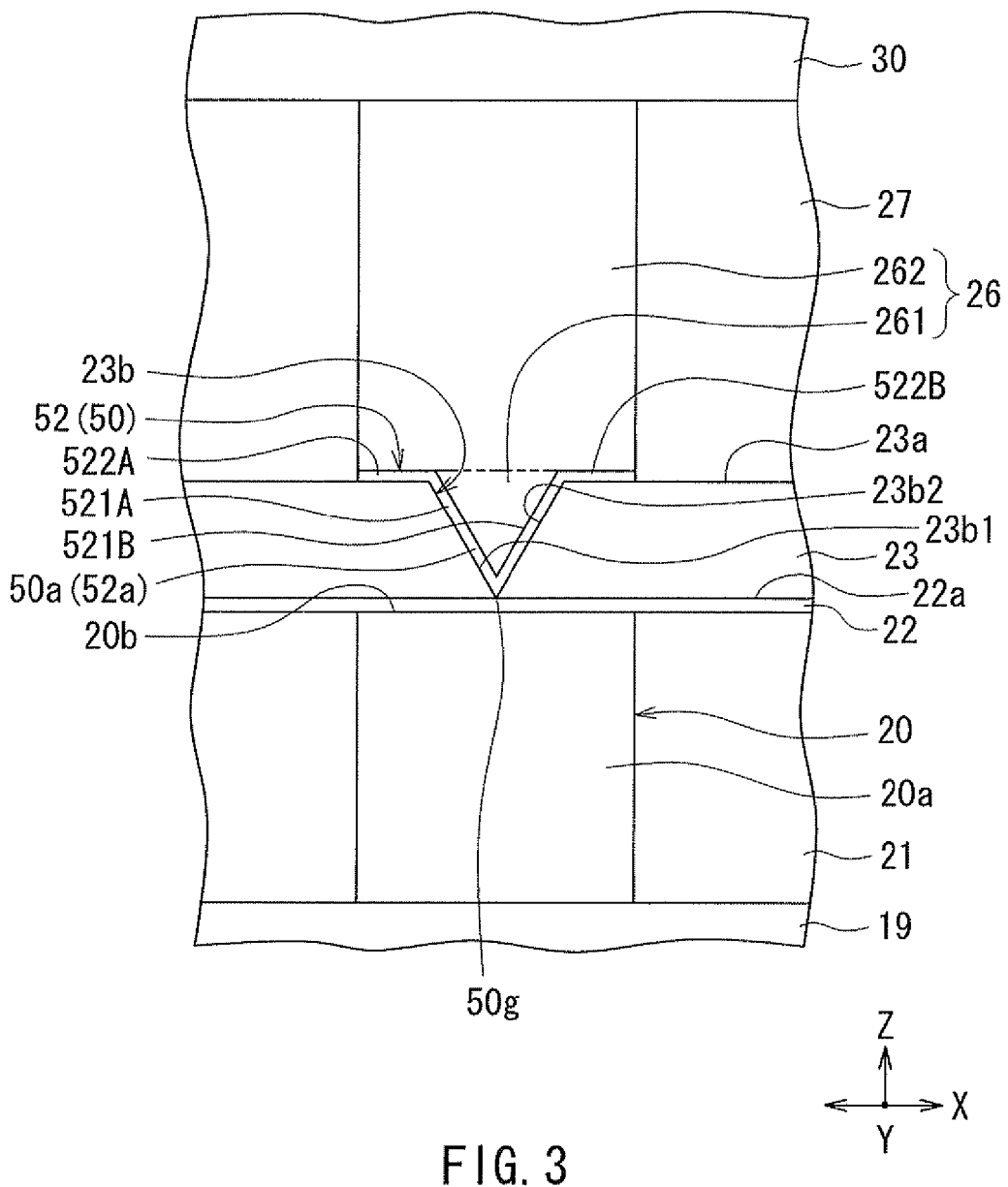
FIG. 3 is a front view showing part of the medium facing surface of the thermally-assisted magnetic recording head according to the first embodiment of the invention.
Figure 4:
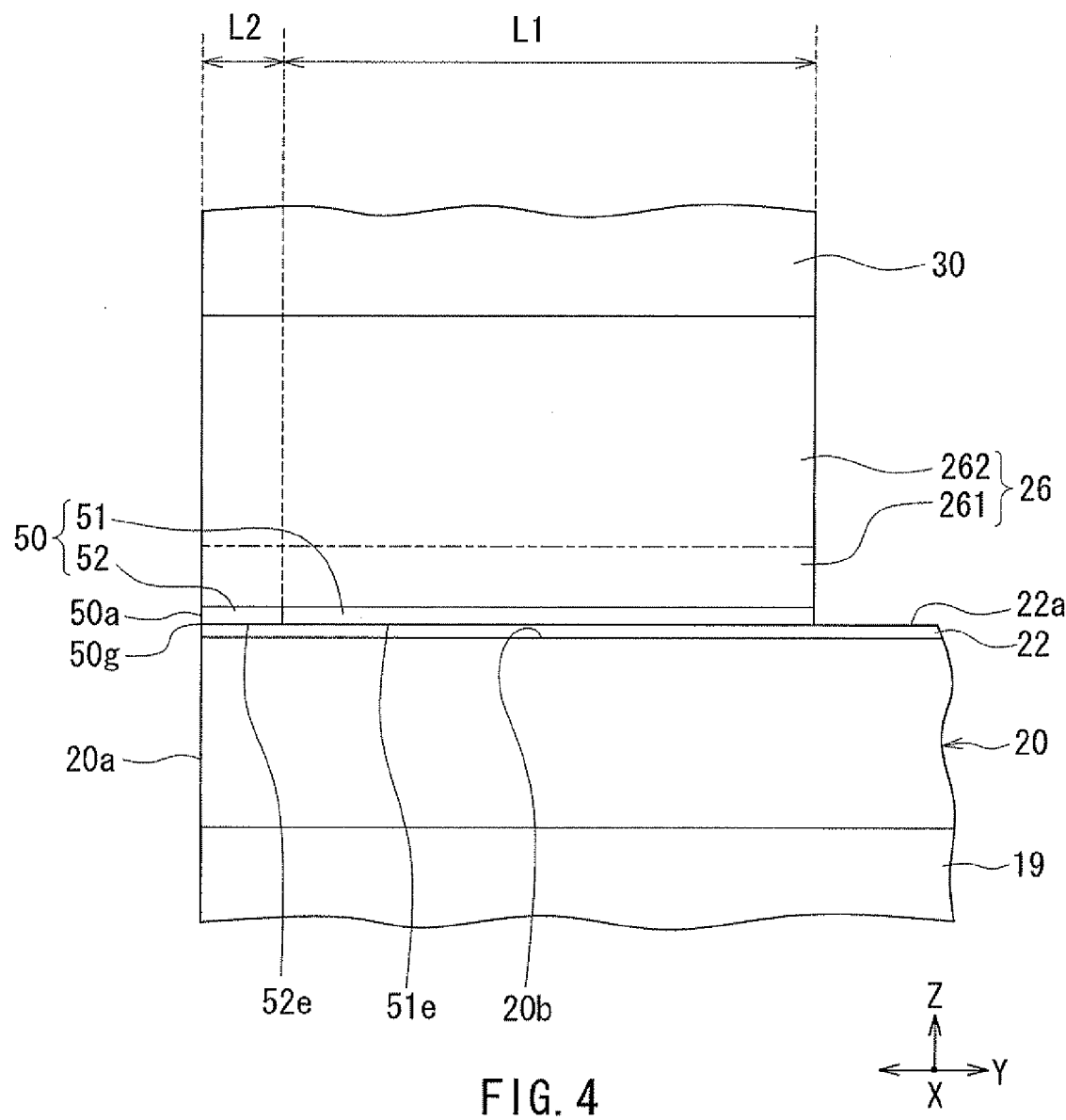
FIG. 4 is a cross-sectional view showing the main part of the thermally-assisted magnetic recording head according to the first embodiment of the invention.

Now, with reference to FIG. 1 to FIG. 4, an example of the shape of the plasmon generator 50 and the main pole 26 will be described in detail. FIG. 1 is a perspective view showing the plasmon generator 50. FIG. 2 is a perspective view showing the main part of the thermally-assisted magnetic recording head. FIG. 3 is a front view showing part of the medium facing surface 40 of the thermally-assisted magnetic recording head. FIG. 4 is a cross-sectional view showing the main part of the thermally-assisted magnetic recording head.

As shown in FIG. 3, the groove 23b of the dielectric layer 23 accommodating at least part of the plasmon generator 50 has a first wall face 23b1 and a second wall face 23b2 intersecting at a predetermined angle. The angle formed between the first wall face 23b1 and the second wall face 23b2 falls within the range of 50° to 120°, for example.

The plasmon generator 50 has a front end face 50a located in the medium facing surface 40. The front end face 50a includes a near-field light generating part 50g that generates near-field light based on surface plasmons.

As shown in FIG. 1, the plasmon generator 50 includes a first portion 51 formed of a first metal material and a second portion 52 formed of a second metal material different from the first metal material. In the present embodiment, the first portion 51 is located away from the medium facing surface 40 so as not to be exposed in the front end face 50a. The second portion 52 is located between the first portion 51 and the medium facing surface 40. The first and second metal materials will be described in detail later.

The outer surface of the first portion 51 includes a first inclined surface opposed to the first wall face 23b1 of the groove 23b, a second inclined surface opposed to the second wall face 23b2 of the groove 23b, and an edge part 51e defined by the first and second inclined surfaces intersecting each other. The edge part 51e is at a predetermined distance from the top surface 20b of the core 20 and extends in the direction perpendicular to the medium facing surface 40 (the Y direction). The angle formed between the two inclined surfaces of the first portion 51 is equal to the angle formed between the two wall faces 23b1 and 23b2 of the groove 23b.

The first portion 51 has a sidewall part 511A including the first inclined surface, a sidewall part 511B including the second inclined surface, and extended portions 512A and 512B that are coupled to the top ends of the sidewall parts 511A and 511B, respectively. The sidewall parts 511A and 511B and the extended portions 512A and 512B are each plate-shaped. The sidewall part 511A is disposed along the first wall face 23b1 of the groove 23b. The sidewall part 511B is disposed along the second wall face 23b2 of the groove 23b. The extended portions 512A and 512B are disposed along the top surface 23a of the dielectric layer 23. The extended portion 512A extends from the top end of the sidewall part 511A in a direction away from both the sidewall parts 511A and 511B. The extended portion 512B extends from the top end of the sidewall part 511B in a direction away from both the sidewall parts 511A and 511B. Note that the first portion 51 may be without the extended portions 512A and 512B.

The outer surface of the second portion 52 includes an end face 52a located in the front end face 50a, a third inclined surface opposed to the first wall face 23b1 of the groove 23b, a fourth inclined surface opposed to the second wall face 23b2 of the groove 23b, and an edge part 52e defined by the third and fourth inclined surfaces intersecting each other. The edge part 52e is at a predetermined distance from the top surface 20b of the core 20 and extends in the direction perpendicular to the medium facing surface 40 (the Y direction) so as to be continuous with the edge part 51e of the first portion 51. The near-field light generating part 50g lies at an end of the edge part 52e. The end face 52a includes the near-field light generating part 50g. The angle formed between the two inclined surfaces of the second portion 52 is equal to the angle formed between the two wall faces 23b1 and 23b2 of the groove 23b.

The second portion 52 has a sidewall part 521A including the third inclined surface, a sidewall part 521B including the fourth inclined surface, an extended portion 522A coupled to the top end of the sidewall part 521A, and an extended portion 522B coupled to the top end of the sidewall part 521B. The sidewall parts 521A and 521B and the extended portions 522A and 522B are each plate-shaped. The sidewall part 521A is disposed along the first wall face 23b1 of the groove 23b so as to be continuous with the sidewall part 511A. The sidewall part 521B is disposed along the second wall face 23b2 of the groove 23b so as to be continuous with the sidewall part 511B. The extended portions 522A and 522B are disposed along the top surface 23a of the dielectric layer 23 so as to be continuous with the extended portions 512A and 512B, respectively. The extended portion 522A extends from the top end of the sidewall part 521A in a direction away from both the sidewall parts 521A and 521B. The extended portion 522B extends from the top end of the sidewall part 521B in a direction away from both the sidewall parts 521A and 521B. Note that the second portion 52 may be without the extended portions 522A and 522B.

Here, as shown in FIG. 4, the length of the first portion 51 in the direction perpendicular to the front end face 50a (the Y direction) will be represented by the symbol L1, and the length of the second portion 52 in the direction perpendicular to the front end face 50a will be represented by the symbol L2. In the present embodiment, the length L1 of the first portion 51 is greater than the length L2 of the second portion 52. More specifically, the length L1 of the first portion 51 falls within the range of 150 to 200 nm, whereas the length L2 of the second portion 52 falls within the range of 2 to 80 nm. The first portion 51 is also greater than the second portion 52 in volume. These facts indicate that the first portion 51 is a main portion of the plasmon generator 50 for excitation and propagation of surface plasmons.

The dimensions of the sidewall parts 521A and 521B in the direction perpendicular to the top surface 1a of the substrate 1 (dimensions in the Z direction) in the medium facing surface 40 are equal to the depth (dimension in the Z direction) of the groove 23b of the dielectric layer 23 in the medium facing surface 40, and are in the range of 0.05 to 0.3 µm, for example. In the present embodiment, the depth of the groove 23b is constant regardless of the distance from the medium facing surface 40. The dimensions of the sidewall parts 521A and 521B in the Z direction are therefore constant regardless of the distance from the medium facing surface 40. The dimensions of the sidewall parts 511A and 511B in the Z direction are constant regardless of the distance from the medium facing surface 40, and are equal to the dimensions of the sidewall parts 521A and 521B in the Z direction.

In the present embodiment, the extended portion 522A and the extended portion 522B are equal in width in the medium facing surface 40. The widths of the extended portions 522A and 522B in the medium facing surface 40 are in the range of 0 to 20 µm, for example. In FIG. 1, the widths of the extended portions 522A and 522B are depicted as being constant regardless of the distance from the medium facing surface 40; however, the extended portions 522A and 522B may have widths that are greater at positions away from the medium facing surface 40 than in the medium facing surface 40. In FIG. 1, the extended portions 512A and 512B are depicted as having the same widths as those of the extended portions 522A and 522B; however, the extended portions 512A and 512B may have widths greater than those of the extended portions 522A and 522B.

When the widths of the extended portions 512A, 512B, 522A, and 522B are constant regardless of the distance from the medium facing surface 40 and equal to each other as shown in FIG. 1, any cross section of the first portion 51 parallel to the medium facing surface 40 and any cross section of the second portion 52 parallel to the medium facing surface 40 are of the same shape. In this case, in the present embodiment, the first portion 51 is greater in volume than the second portion 52 since the length L1 of the first portion 51 is greater than the length L2 of the second portion 52.

The main pole 26 includes a first portion 261 and a second portion 262. The first portion 261 is accommodated in the space defined by the sidewall parts 511A, 511B, 521A, and 521B of the plasmon generator 50. The second portion 262 is located farther from the core 20 than is the first portion 261. In FIG. 2 to FIG. 4, the boundary between the first portion 261 and the second portion 262 is shown by chain double-dashed lines. As viewed from above, the positions of the outer edges of the second portion 262 may coincide with or be close to the positions of the outer edges of the extended portions 512A, 512B, 522A, and 522B.

The shapes and the arrangement of the plasmon generator 50 and the main pole 26 are not limited to the foregoing example that has been described with reference to FIG. 1 to FIG. 4.

Now, the principle of generation of near-field light in the present embodiment and the principle of thermally-assisted magnetic recording using the near-field light will be described in detail. Laser light emitted from a not-shown laser diode enters the core 20. As shown in FIG. 5, the laser light 60 propagates through the core 20 toward the medium facing surface 40, and reaches the vicinity of the plasmon generator 50. The laser light 60 is then totally reflected at the top surface 20b of the core 20. This generates evanescent light permeating into the gap layer 22. As a result, surface plasmons are excited at least on the edge part 51e of the first portion 51 of the plasmon generator 50 through coupling with the evanescent light.

The surface plasmons excited on the edge part 51e of the first portion 51 propagate through the edge part 51e and the edge part 52e in succession to reach the near-field light generating part 50g. Consequently, the surface plasmons concentrate at the near-field light generating part 50g, and the near-field light generating part 50g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 26 for data writing.

Now, the first and second metal materials will be described. The first and second metal materials are selected from the group of metal materials consisting of Ag, Au, Cu, Al, Ru, Pt, Ta, W, Pd, Ti, Cr, and Ni, for example. In the present embodiment, a combination of metal materials to be used as the first and second metal materials may be selected from among the aforementioned group of metal materials from at least one of first to third points of view described below. The first metal material is preferably one of Ag, Au, Al, and Cu which are high in electrical conductivity.

The first point of view will be described first. The first point of view relates to corrosion. In the present embodiment, the second portion 52 formed of the second metal material includes the end face 52a located in the front end face 50a of the plasmon generator 50, whereas the first portion 51 formed of the first metal material is not exposed in the front end face 50a. The front end face 50a is located in the medium facing surface 40, and may therefore be in contact with a high-temperature and high-humidity atmosphere. If the second portion 52 is formed of an easily oxidizable metal material, the second portion 52 may be corroded by oxidation when the end face 52a of the second portion 52 is in contact with a high-temperature and high-humidity atmosphere. The second portion 52 is therefore preferably formed of a metal material that is resistant to corrosion by oxidation. For example, ionization tendency is an indicator of the resistance of a metal material to corrosion by oxidation. A metal material having a lower ionization tendency is higher in resistance to corrosion by oxidation. The first point of view is therefore that the second metal material should be a material having an ionization tendency lower than that of the first metal material. This makes it possible that while the second portion 52 exposed in the front end face 50a is prevented from being corroded, a metal material suitable for excitation and propagation of surface plasmons, for example, can be selected as the first metal material, i.e., the material of the first portion 51 which is not exposed in the front end face 50a, without consideration of corrosion by oxidation.

The following is a listing of a plurality of metal materials included in the aforementioned group of metal materials and hydrogen ($H_2$) in ascending order of ionization tendency: Au, Pt, Pd, Ag, Cu, $H_2$, Ni, Cr, Ta, Al, and Ti (this sequence will hereinafter be referred to as the first sequence). Ru and W are not included in the first sequence. This is because the relationships between Ru, W and the elements in the first sequence in terms of ionization tendency are not clearly known. However, the ionization tendency of Ru may be lower than that of $H_2$, and the ionization tendency of W may be higher than that of $H_2$.

From the first point of view, for example, any two metal materials may be selected from among the aforementioned group of metal materials, and one of the two metal materials that has a relatively lower ionization tendency may be employed as the second metal material while the other having a relatively higher ionization tendency may be employed as the first metal material. For example, where Au is selected as the second metal material, any of metal materials in the aforementioned group of metal materials except for Au can be selected as the first metal material. Where one of Ag, Al, and Cu is selected as the first metal material, a metal material that is lower in ionization tendency than the selected first metal material in the first sequence can be selected as the second metal material. Where W is selected as the first metal material, a metal material having an ionization tendency lower than that of $H_2$ can be selected as the second metal material. Where Ru is selected as the second metal material, a metal material having an ionization tendency higher than that of $H_2$ can be selected as the first metal material.

Selecting a combination of metal materials to be used as the first and second metal materials from the first point of view as described above makes it possible to accomplish appropriate excitation and propagation of surface plasmons on the first portion 51 while preventing the plasmon generator 50 (the second portion 52) from being corroded. This feature is not achievable by a plasmon generator formed of a single material. For example, in the case of a plasmon generator 50 where Ag is employed as the first metal material and Au is employed as the second metal material, corrosion at and in the vicinity of the front end face 50a can be prevented more effectively as compared with a plasmon generator formed entirely of Ag, and a higher electrical conductivity is achieved in the main portion (the first portion 51) as compared with a plasmon generator formed entirely of Au.

The second point of view will now be described. The second point of view relates to the excitation and propagation of surface plasmons and to the diameter of a heated spot. To allow the plasmon generator 50 to excite a large number of surface plasmons and to propagate the excited surface plasmons efficiently, it is preferable that the material forming the plasmon generator 50 be high in electrical conductivity. However, if the plasmon generator 50 is formed of a single material having a high electrical conductivity, there arises the problem that the near-field light generated from the near-field light generating part 50g is excessively high in intensity to cause the heated spot to be large in diameter. On the other hand, if the plasmon generator 50 is formed of a single material having a low electrical conductivity, there arises the problem that the plasmon generator 50 cannot excite a sufficient number of surface plasmons and the excited surface plasmons are significantly attenuated before they reach the near-field light generating part 50g. The second point of view is therefore that the second metal material should be a material having an electrical conductivity lower than that of the first metal material. Consequently, adjustment (control) of the intensity of the near-field light generated from the near-field light generating part 50g is made possible by selecting any metal material having a lower electrical conductivity than that of the first metal material as the second metal material, i.e., the material of the second portion 52, while appropriate excitation and propagation of surface plasmons are made possible by selecting a metal material having a higher electrical conductivity as the first metal material, i.e., the material of the first portion 51 which is the main portion of the plasmon generator 50 contributing to the excitation and propagation of surface plasmons.

The following is a listing of the aforementioned group of metal materials in ascending order of electrical conductivity: Ti, Ta, Cr, Pd, Pt, Ru, Ni, W, Al, Au, Cu, and Ag (this sequence will hereinafter be referred to as the second sequence). From the second point of view, for example, any two metal materials may be selected from among the aforementioned group of metal materials, and one of the two metal materials that has a relatively lower electrical conductivity may be employed as the second metal material while the other having a relatively higher electrical conductivity may be employed as the first metal material. For example, where Ag is selected as the first metal material, any of metal materials in the aforementioned group of metal materials except for Ag can be selected as the second metal material. Where one of Au, Al, and Cu is selected as the first metal material, a metal material that is lower in electrical conductivity than the selected first metal material in the second sequence can be selected as the second metal material.

Selecting a combination of metal materials to be used as the first and second metal materials from the second point of view as described above makes it possible that, while the first portion 51 accomplishes appropriate excitation and propagation of surface plasmons, the second portion 52 adjusts (controls) the intensity of the near-field light generated from the near-field light generating part 50g to prevent an increase in diameter of the heated spot caused by an excessively high intensity of the near-field light generated from the near-field light generating part 50g. This feature is not achievable by a plasmon generator formed of a single material.

The third point of view will now be described. The third point of view relates to mechanical strength. In the plasmon generator 50 of the present embodiment, the front end face 50a is located in the medium facing surface 40. Accordingly, the front end face 50a and its vicinity can easily suffer mechanical damage such as deformation if they are low in mechanical strength. It is therefore preferable that the second portion 52 exposed in the front end face 50a be formed of a material having high mechanical strength. For example, Vickers hardness is an indicator of the mechanical strength of a metal material. A metal material having a higher Vickers hardness is higher in mechanical strength. The third point of view is therefore that the second metal material should be a material having a Vickers hardness higher than that of the first metal material. This makes it possible that while the second portion 52 exposed in the front end face 50a is prevented from suffering mechanical damage, a metal material suitable for excitation and propagation of surface plasmons, for example, can be selected as the first metal material, i.e., the material of the first portion 51 which is not exposed in the front end face 50a, without consideration of mechanical strength.

The following is a listing of the aforementioned group of metal materials in descending order of Vickers hardness: W, Cr, Ti, Ta, Ru, Ni, Pt, Pd, Cu, Ag, Au, and Al (this sequence will hereinafter be referred to as the third sequence). From the third point of view, for example, any two metal materials may be selected from among the aforementioned group of metal materials, and one of the two metal materials that has a relatively higher Vickers hardness may be employed as the second metal material while the other having a relatively lower Vickers hardness may be employed as the first metal material. For example, where Al is selected as the first metal material, any of metal materials in the aforementioned group of metal materials except for Al can be selected as the second metal material. Where one of Ag, Au, and Cu is selected as the first metal material, a metal material that is higher in Vickers hardness than the selected first metal material in the third sequence can be selected as the second metal material.

Selecting a combination of metal materials to be used as the first and second metal materials from the third point of view as described above makes it possible to accomplish appropriate excitation and propagation of surface plasmons on the first portion 51 while preventing the plasmon generator 50 (the second portion 52) from suffering mechanical damage. This feature is not achievable by a plasmon generator formed of a single material. For example, in the case of a plasmon generator 50 where Ag or Au is employed as the first metal material and Ru is employed as the second metal material, mechanical damage to the plasmon generator 50 (the second portion 52) can be prevented more effectively as compared with a plasmon generator formed entirely of Ag or Au, and a higher electrical conductivity is achieved in the main portion (the first portion 51) as compared with a plasmon generator formed entirely of Ru.

In the present embodiment, a combination of metal materials to be used as the first and second metal materials may be selected from two or more of the aforementioned first to third points of view. For example, suppose that the first metal material is Ag. In this case, as the second metal material, Pt or Pd can be selected from the first to third points of view or from the first and third points of view; Au, Pt, or Pd can be selected from the first and second points of view; and W, Cr, Ti, Ta, Ru, Ni, Pt, Pd, or Cu can be selected from the second and third points of view. For example, where the first metal material is Au, the second metal material may be Ti, Ta, Cr, Pd, Pt, Ru, Ni, or W from the second and third points of view.

As describe above, the plasmon generator 50 of the present embodiment provides the features that cannot be achieved by a plasmon generator formed of a single material.

Where the second metal material is lower in electrical conductivity than the first metal material, the efficiencies of excitation and propagation of surface plasmons on the plasmon generator 50 may be significantly reduced if the length L2 of the second portion 52 is excessively great. To avoid this, the present embodiment is configured so that the length L1 of the first portion 51 is greater than the length L2 of the second portion 52. More specifically, the length L1 of the first portion 51 is preferably in the range of 150 to 200 nm and the length L2 of the second portion 52 is preferably in the range of 2 to 80 nm. This makes it possible to prevent the second portion 52 from causing significant reductions in the efficiencies of excitation and propagation of surface plasmons on the plasmon generator 50.

Now, with reference to FIG. 5 and FIG. 6, a description will be given of a method of manufacturing the thermally-assisted magnetic recording head according to the present embodiment. The method of manufacturing the thermally-assisted magnetic recording head according to the present embodiment includes the steps of forming components of a plurality of thermally-assisted magnetic recording heads, except the substrates 1, on a substrate that includes portions to become the substrates 1 of the plurality of thermally-assisted magnetic recording heads, thereby fabricating a substructure including a plurality pre-head portions aligned in a plurality of rows, the plurality of pre-head portions being intended to become individual thermally-assisted magnetic recording heads later; and forming the plurality of thermally-assisted magnetic recording heads by cutting the substructure to separate the plurality of pre-head portions from each other.

The method of manufacturing the thermally-assisted magnetic recording head according to the present embodiment will now be described in more detail with attention focused on a single thermally-assisted magnetic recording head. In the method of manufacturing the thermally-assisted magnetic recording head according to the present embodiment, the insulating layer 2 is formed on the substrate 1 first. The bottom shield layer 3 is then formed on the insulating layer 2. Next, the insulating layer 4 is formed to cover the bottom shield layer 3. The insulating layer 4 is then polished by, for example, chemical mechanical polishing (hereinafter referred to as CMP), until the bottom shield layer 3 is exposed.

Next, the bottom shield gap film 5 is formed over the bottom shield layer 3 and the insulating layer 4. Then, the MR element 6 and not-shown two leads connected to the MR element 6 are formed on the bottom shield gap film 5. The top shield gap film 7 is then formed to cover the MR element 6 and the leads. The top shield layer 8 is then formed on the top shield gap film 7. Next, the insulating layer 9 is formed to cover the top shield layer 8. The insulating layer 9 is then polished by, for example, CMP, until the top shield layer 8 is exposed.

Next, the nonmagnetic layer 10 is formed over the top shield layer 8 and the insulating layer 9. The return pole layer 11 is then formed on the nonmagnetic layer 10. Next, the insulating layer 12 is formed to cover the return pole layer 11. The insulating layer 12 is then polished by, for example, CMP, until the return pole layer 11 is exposed. Next, the insulating layer 14 is formed over the return pole layer 11 and the insulating layer 12.

The insulating layer 14 is then selectively etched to form therein two openings for exposing the top surface of the return pole layer 11. Then, the first layers of the coupling portions 13A and 13B are formed on the return pole layer 11. Next, the coil 15 is formed on the insulating layer 14. The insulating layer 16 is then formed in the space between every adjacent turns of the coil 15. Next, the insulating layer 17 is formed over the entire top surface of the stack. The insulating layer 17 is then polished by, for example, CMP, until the first layers of the coupling portions 13A and 13B, the coil 15, and the insulating layer 16 are exposed. The top surfaces of the first layers of the coupling portions 13A and 13B, the coil 15, and the insulating layers 16 and 17 are thereby made even with each other. Next, the insulating layer 18 is formed over the first layers of the coupling portions 13A and 13B, the coil 15, and the insulating layers 16 and 17.

The insulating layer 18 is then selectively etched to form therein two openings for exposing the top surfaces of the first layers of the coupling portions 13A and 13B. Next, the second layers of the coupling portions 13A and 13B are formed on the first layers of the coupling portions 13A and 13B. Next, the cladding layer 19 is formed to cover the second layers of the coupling portions 13A and 13B. The cladding layer 19 is then polished by, for example, CMP, until the second layers of the coupling portions 13A and 13B are exposed.

Next, the third layers of the coupling portions 13A and 13B are formed on the second layers of the coupling portions 13A and 13B. The core 20 is then formed on the cladding layer 19. Next, the cladding layer 21 is formed over the entire top surface of the stack. The cladding layer 21 is then polished by, for example, CMP, until the third layers of the coupling portions 13A and 13B and the core 20 are exposed. The top surfaces of the third layers of the coupling portions 13A and 13B, the core 20, and the cladding layer 21 are thereby made even with each other. Next, the gap layer 22 is formed over the third layers of the coupling portions 13A and 13B, the core 20, and the cladding layer 21.

The dielectric layer 23, the plasmon generator 50, and the main pole 26 are then formed in this order on the gap layer 22. The main pole 26 is formed by plating, for example. The process for forming the dielectric layer 23 and the process for forming the plasmon generator 50 will be described in detail later.

Next, the dielectric layer 23 is selectively etched to form therein two openings for exposing the top surfaces of the third layers of the coupling portions 13A and 13B. Then, portions of the gap layer 22 that are exposed from the two openings of the dielectric layer 23 are removed by etching. The etching of the gap layer 22 may be performed at the same time as when the dielectric layer 23 is etched. The fourth layers of the coupling portions 13A and 13B are then formed on the third layers of the coupling portions 13A and 13B.

Next, the dielectric layer 27 is formed to cover the main pole 26 and the fourth layers of the coupling portions 13A and 13B. The dielectric layer 27 is then polished by, for example, CMP, until the main pole 26 and the fourth layers of the coupling portions 13A and 13B are exposed. Next, the coil 28 is formed on the dielectric layer 27. The insulating layer 29 is then formed to cover the coil 28. Next, the yoke layer 30 is formed over the main pole 26, the fourth layers of the coupling portions 13A and 13B, the dielectric layer 27, and the insulating layer 29. Next, the protective layer 31 is formed to cover the yoke layer 30. Wiring, terminals, and other components are then formed on the top surface of the protective layer 31.

When the substructure is completed thus, the substructure is cut to separate the plurality of pre-head portions from each other, followed by the polishing of the medium facing surface 40 and the fabrication of flying rails etc. This completes the thermally-assisted magnetic recording head.

Figure 7:
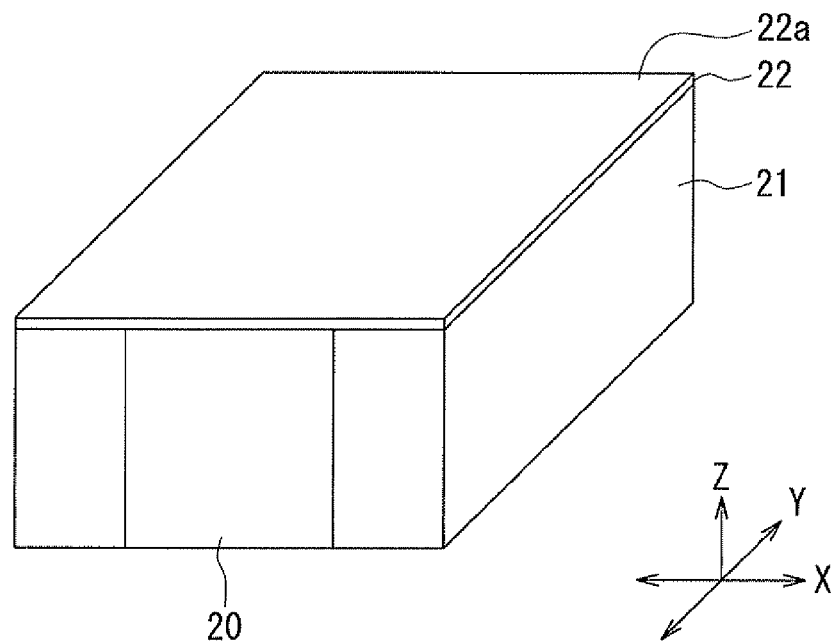
FIG. 7 is a perspective view showing a step of a method of manufacturing the thermally-assisted magnetic recording head according to the first embodiment of the invention.

Reference is now made to FIG. 7 to FIG. 13 to describe the process for forming the dielectric layer 23 and the process for forming the plasmon generator 50 in detail. FIG. 7 to FIG. 13 are perspective views each showing a stack of layers formed in the process of manufacturing the thermally-assisted magnetic recording head. FIG. 7 shows a stack having undergone the step of forming the gap layer 22.

Figure 8:
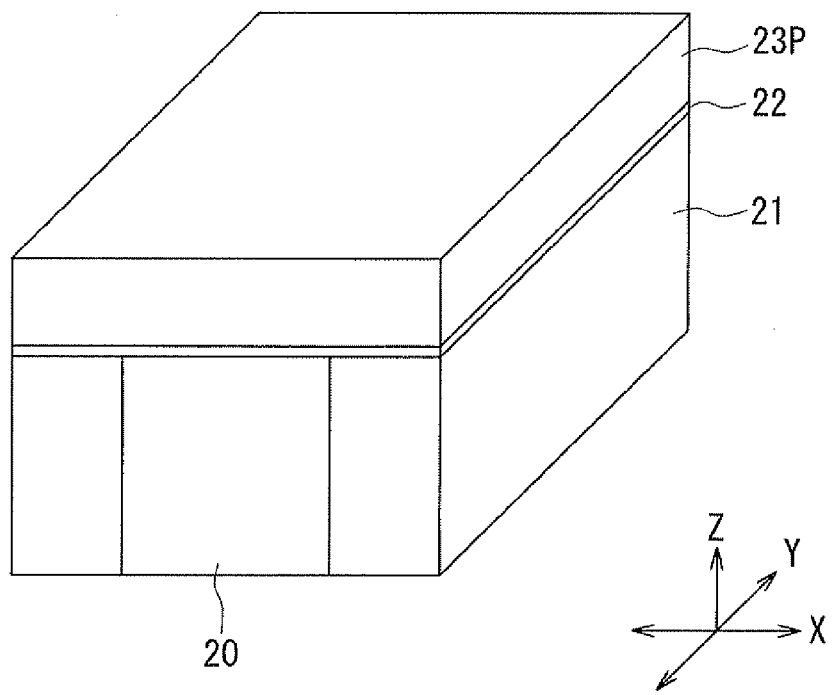
FIG. 8 is a perspective view showing a step that follows the step shown in FIG. 7.

FIG. 8 shows a step that follows the formation of the gap layer 22. In this step, a layer to be etched 23P is formed on the top surface 22a of the gap layer 22. The layer to be etched 23P is to become the dielectric layer 23 later.

Figure 9:
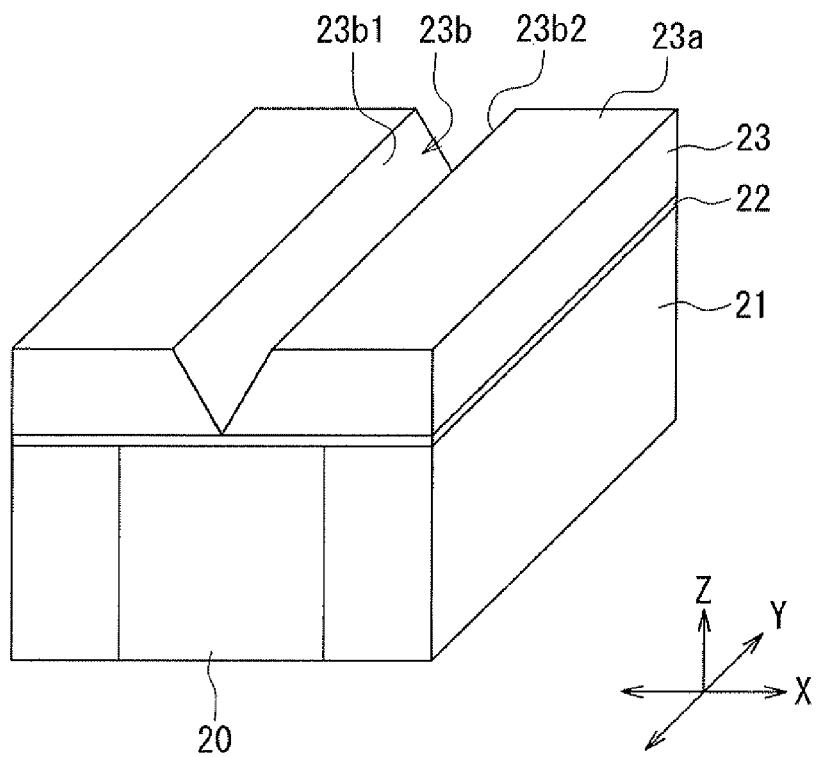
FIG. 9 is a perspective view showing a step that follows the step shown in FIG. 8.

FIG. 9 shows the next step. In this step, first, a photoresist mask (not shown) is formed on the top surface of the layer to be etched 23P. The photoresist mask has an opening whose shape corresponds to the planar shape of the groove 23b to be formed later. The photoresist mask is formed by patterning a photoresist layer by photolithography. Next, a portion of the layer to be etched 23P exposed from the opening of the photoresist mask is taper-etched by, for example, reactive ion etching (hereinafter referred to as RIE), using the photoresist mask as the etching mask. The groove 23b is thereby formed. This makes the layer 23P into the dielectric layer 23. The photoresist mask is then removed.

The groove 23b may be formed such that its bottom end reaches or does not reach the top surface 22a of the gap layer 22. In the case of forming the groove 23b such that its bottom end reaches the top surface 22a of the gap layer 22, the layer to be etched 23P may be formed of a dielectric material different from that used for the gap layer 22. In this case, the gap layer 22 may function as an etching stopper for stopping the etching. If alumina is employed as the material of the gap layer 22, the layer to be etched 23P may be formed of $SiO_2$, for example.

Figure 10:
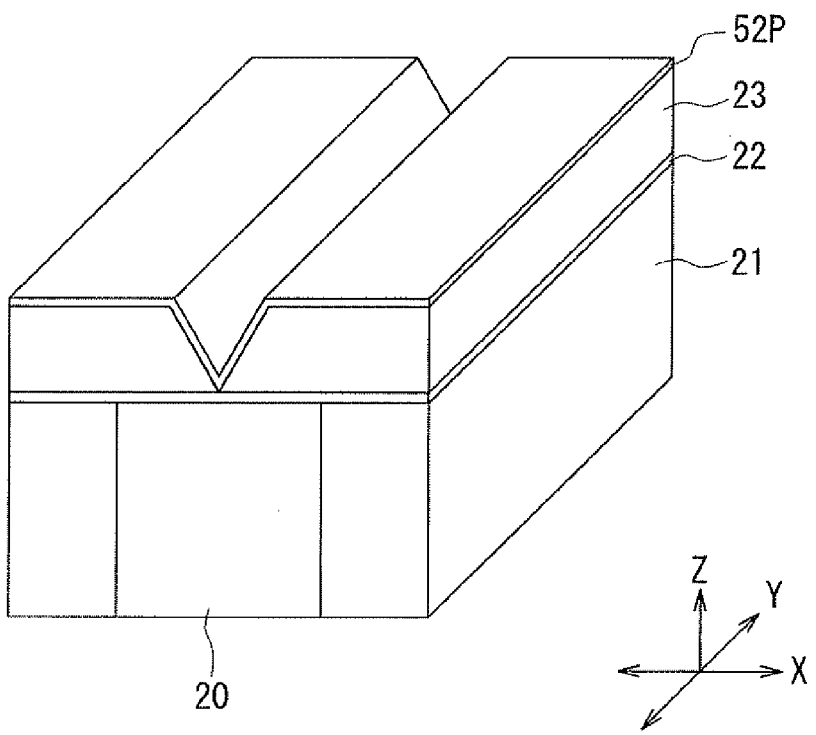
FIG. 10 is a perspective view showing a step that follows the step shown in FIG. 9.

FIG. 10 shows the next step. In this step, a second metal material film 52P made of the second metal material is formed over the entire top surface of the stack by sputtering, for example. The second metal material film 52P is formed along the top surface 23a of the dielectric layer 23 and the first and second wall faces 23b1 and 23b2 of the groove 23b.

Figure 11:
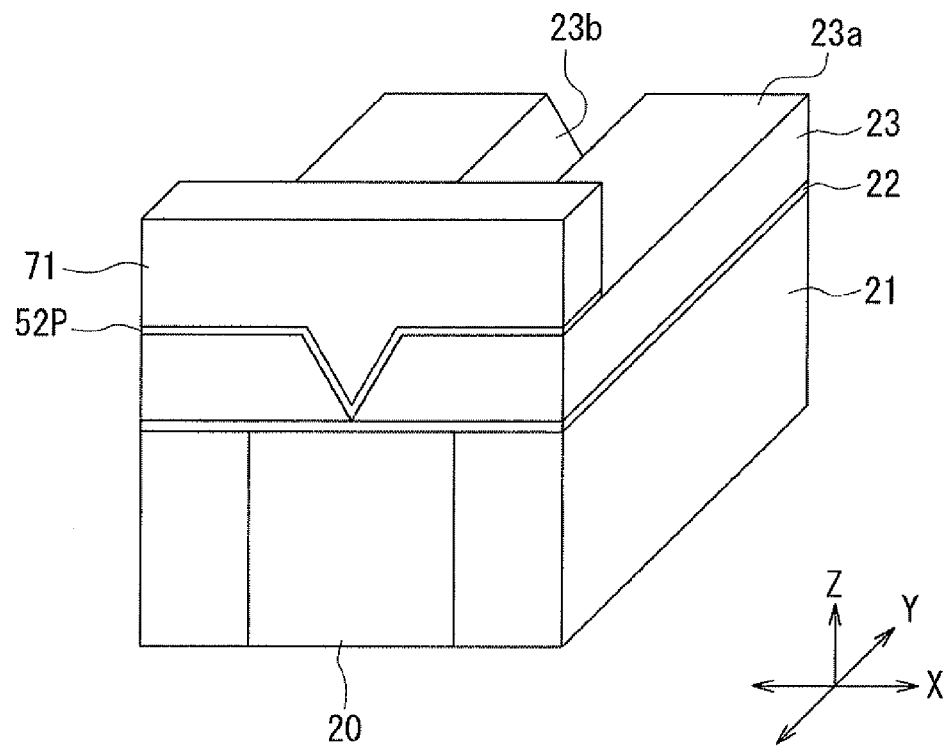
FIG. 11 is a perspective view showing a step that follows the step shown in FIG. 10.

FIG. 11 shows the next step. In this step, first, a photoresist mask 71 is formed on the second metal material film 52P. The photoresist mask 71 partially covers the area where the plasmon generator 50 is to be formed. More specifically, the photoresist mask 71 covers the area where the second portion 52 is to be formed, and does not cover the area where the first portion 51 is to be formed. The photoresist mask 71 is formed by patterning a photoresist layer by photolithography. Next, the second metal material film 52P except the portion thereof lying under the photoresist mask 71 is removed by, for example, ion beam etching (hereinafter referred to as IBE), using the photoresist mask 71 as the etching mask.

Figure 12:
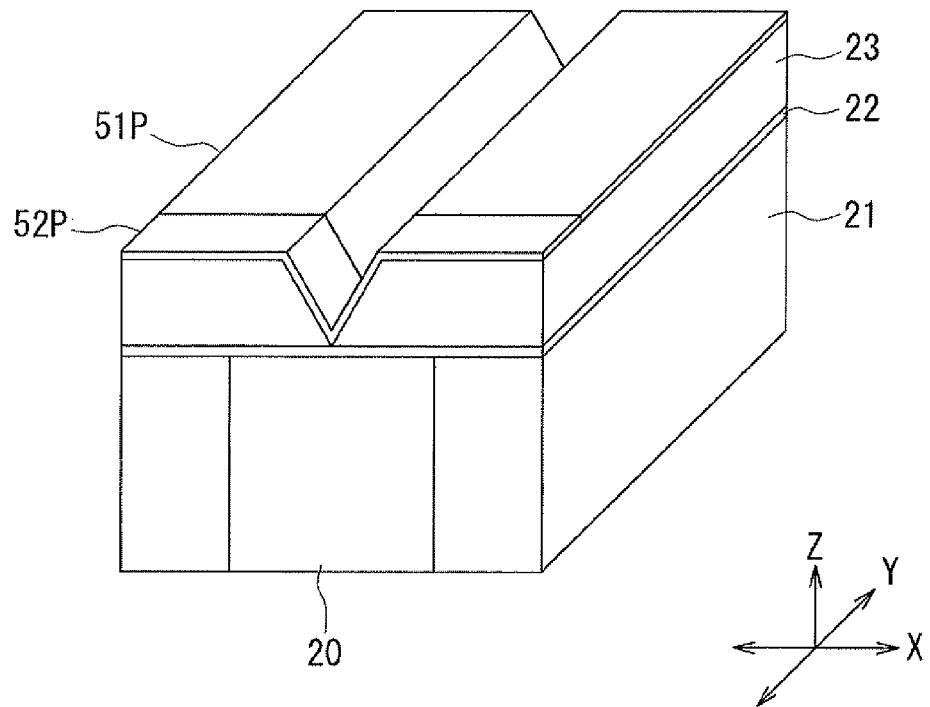
FIG. 12 is a perspective view showing a step that follows the step shown in FIG. 11.

FIG. 12 shows the next step. In this step, first, with the photoresist mask 71 left unremoved, a first metal material film 51P made of the first metal material is formed over the entire top surface of the stack. The first metal material film 51P is formed along the top and side surfaces of the photoresist mask 71, the top surface 23a of the dielectric layer 23, and the first and second wall faces 23b1 and 23b2 of the groove 23b. The photoresist mask 71 is then lifted off.

Figure 13:
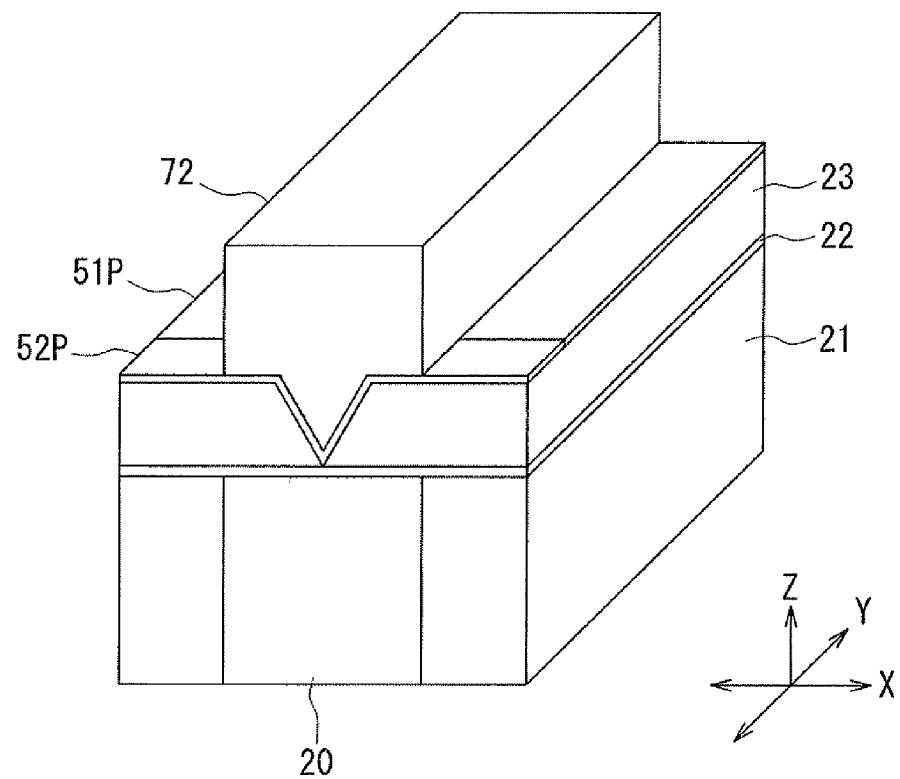
FIG. 13 is a perspective view showing a step that follows the step shown in FIG. 12.

FIG. 13 shows the next step. In this step, a photoresist mask 72, whose planar shape corresponds to that of the plasmon generator 50, is formed over the first and second metal material films 51P and 52P. The photoresist mask 72 is formed by patterning a photoresist layer by photolithography.

Figure 14:
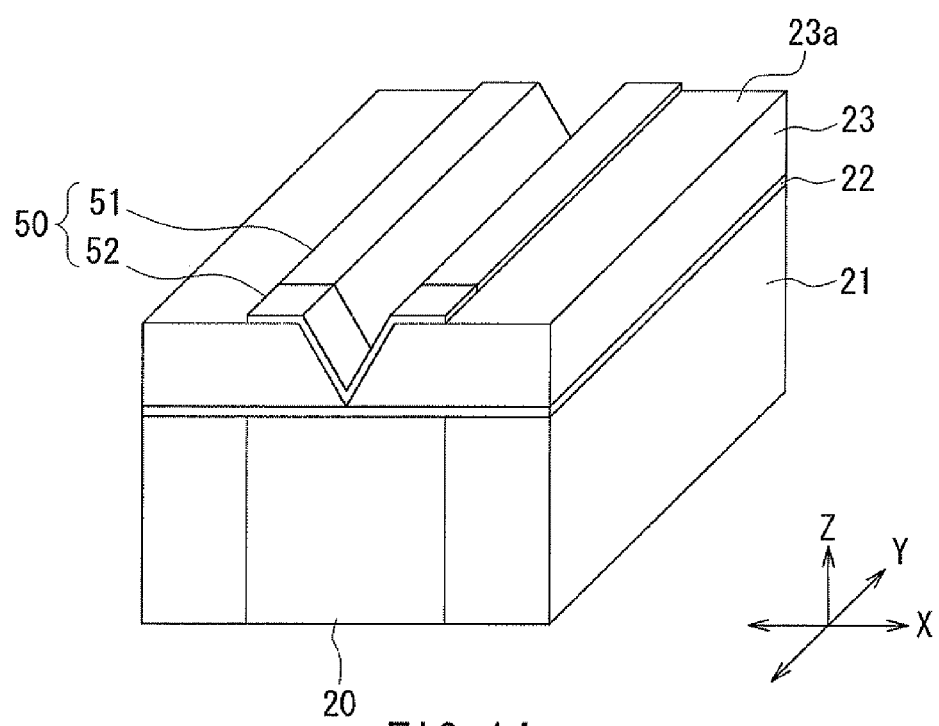
FIG. 14 is a perspective view showing a step that follows the step shown in FIG. 13.

FIG. 14 shows the next step. In this step, first, the first and second metal material films 51P and 52P except the respective portions lying under the photoresist mask 72 are removed by, for example, IBE, using the photoresist mask 72 as the etching mask. This makes the first metal material film 51P into the first portion 51 and the second metal material film 52P into the second portion 52. The photoresist mask 72 is then removed. The plasmon generator 50 is completed through the series of steps described above.

Modification Example

Figure 15:
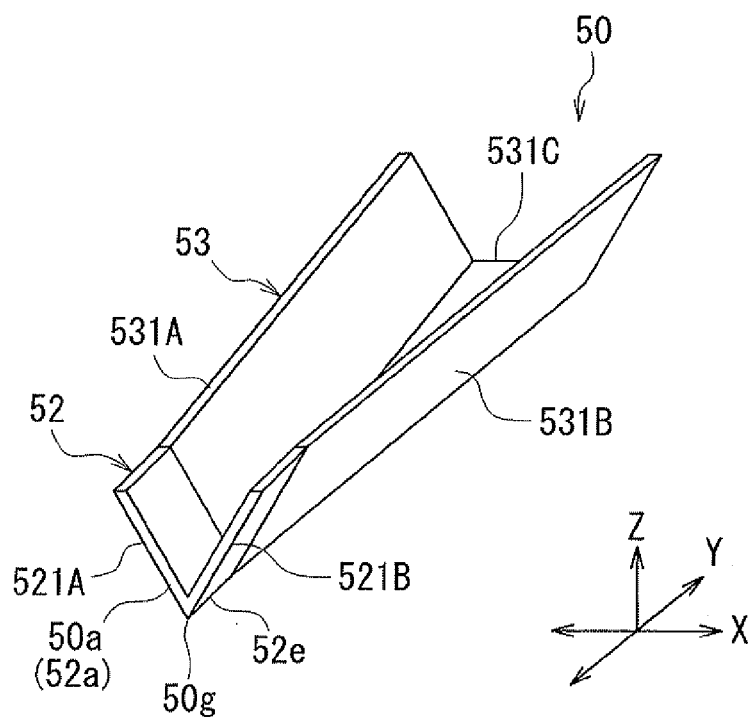
FIG. 15 is a perspective view showing a modification example of the plasmon generator according to the first embodiment of the invention.
Figure 16:
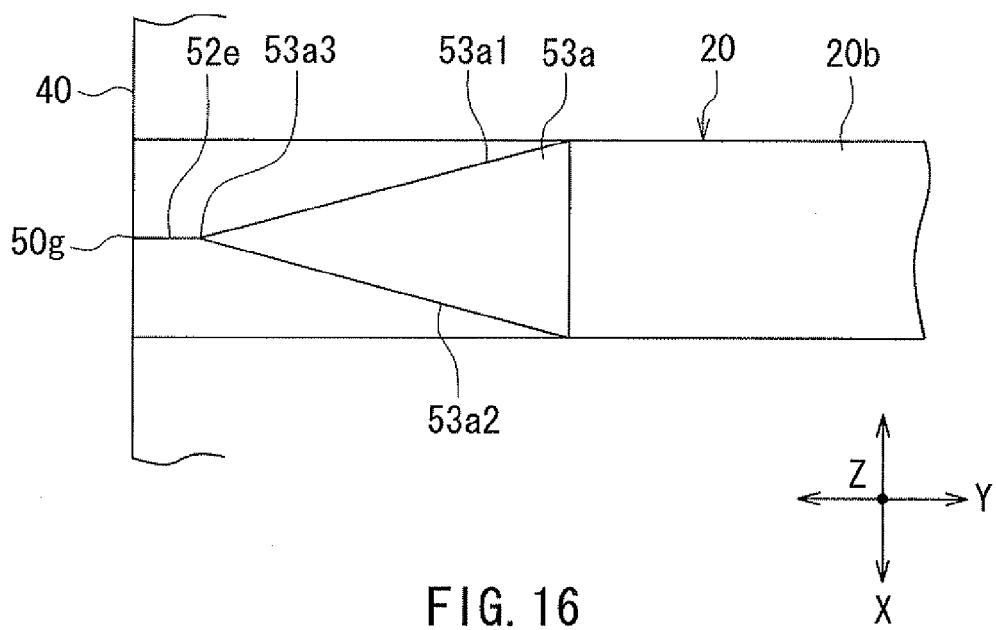
FIG. 16 is a plan view showing a portion of the plasmon generator of FIG. 15 opposed to the core of the waveguide.

Reference is now made to FIG. 15 and FIG. 16 to describe a modification example of the plasmon generator according to the present embodiment. FIG. 15 is a perspective view showing a plasmon generator of the modification example. FIG. 16 is a plan view showing a portion of the plasmon generator of FIG. 15 opposed to the core 20 of the waveguide. The plasmon generator 50 of the modification example has a first portion 53 formed of the first metal material, in place of the first portion 51 shown in FIG. 1, FIG. 2, and FIG. 4.

The first portion 53 has a sidewall part 531 continuous with the sidewall part 521A of the second portion 52, a sidewall part 531B continuous with the sidewall part 521B of the second portion 52, and a bottom part 531C facing the top surface 20b of the core 20. The sidewall parts 531A and 531B and the bottom part 531C are each plate-shaped. The sidewall parts 531A and 531B are located farther from the top surface 20b of the core 20 than is the bottom part 531C, and are connected to opposite ends of the bottom part 531C in the X direction.

The width of the bottom part 531C in the X direction decreases with increasing proximity to the medium facing surface 40. At the end of the first portion 53 closer to the medium facing surface 40, the width of the bottom part 531C is zero and the respective bottom ends of the sidewall parts 531A and 531B are thus in contact with each other.

The distance between the two sidewall parts 531A and 531B in the X direction increases with increasing distance from the top surface 20b, and decreases with increasing proximity to the medium facing surface 40.

The outer surface of the first portion 53 includes a surface plasmon exciting surface 53a that is formed by the bottom surface of the bottom part 531C. FIG. 16 shows the surface plasmon exciting surface 53a of the first portion 53 and the edge part 52e of the second portion 52 as viewed from above. As shown in FIG. 16, the width of the surface plasmon exciting surface 53a in the X direction decreases with increasing proximity to the medium facing surface 40. The surface plasmon exciting surface 53a has two sides 53a1 and 53a2 that are located on opposite sides in the width direction (the X direction), and a front end 53a3 that is formed by the two sides 53a1 and 53a2 intersecting each other. The front end 53a3 is located away from the medium facing surface 40. The angle formed between the two sides 53a1 and 53a2 falls within the range of 10° to 60°, for example.

In the modification example, surface plasmons are excited mainly on the surface plasmon exciting surface 53a of the first portion 53. The surface plasmons excited on the surface plasmon exciting surface 53a propagate on the surface plasmon exciting surface 53a toward the near-field light generating part 50g. The width of the surface plasmon exciting surface 53a in the X direction decreases with increasing proximity to the medium facing surface 40. Consequently, the surface plasmons excited on the surface plasmon exciting surface 53a are concentrated and transformed into edge plasmons to propagate through the edge part 52e. The edge plasmons eventually reaches the near-field light generating part 50g. As a result, the edge plasmons concentrate at the near-field light generating part 50, and near-field light is generated from the near-field light generating part 50 based on the edge plasmons.

The modification example allows the bottom surface of the plasmon generator 50 facing the top surface 20b of the core 20 to be larger in area to allow more surface plasmons to be excited than in the case where the surface plasmon exciting surface 53a is not provided.

In the example shown in FIG. 15, the first and second portions 53 and 52 are without the two extended portions shown in FIG. 1; however, the first and second portions 53 and 52 may each have the two extended portions.

Second Embodiment

Figure 17:
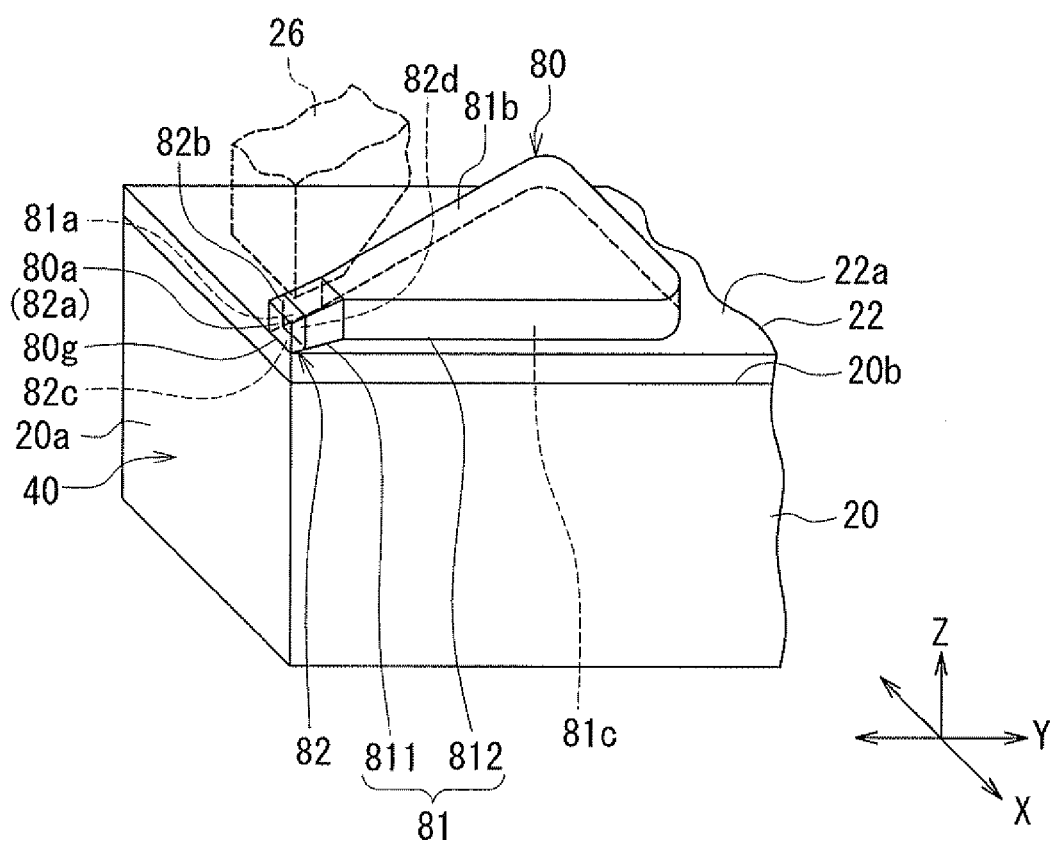
FIG. 17 is a perspective view showing the main part of a thermally-assisted magnetic recording head according to a second embodiment of the invention.
Figure 18:
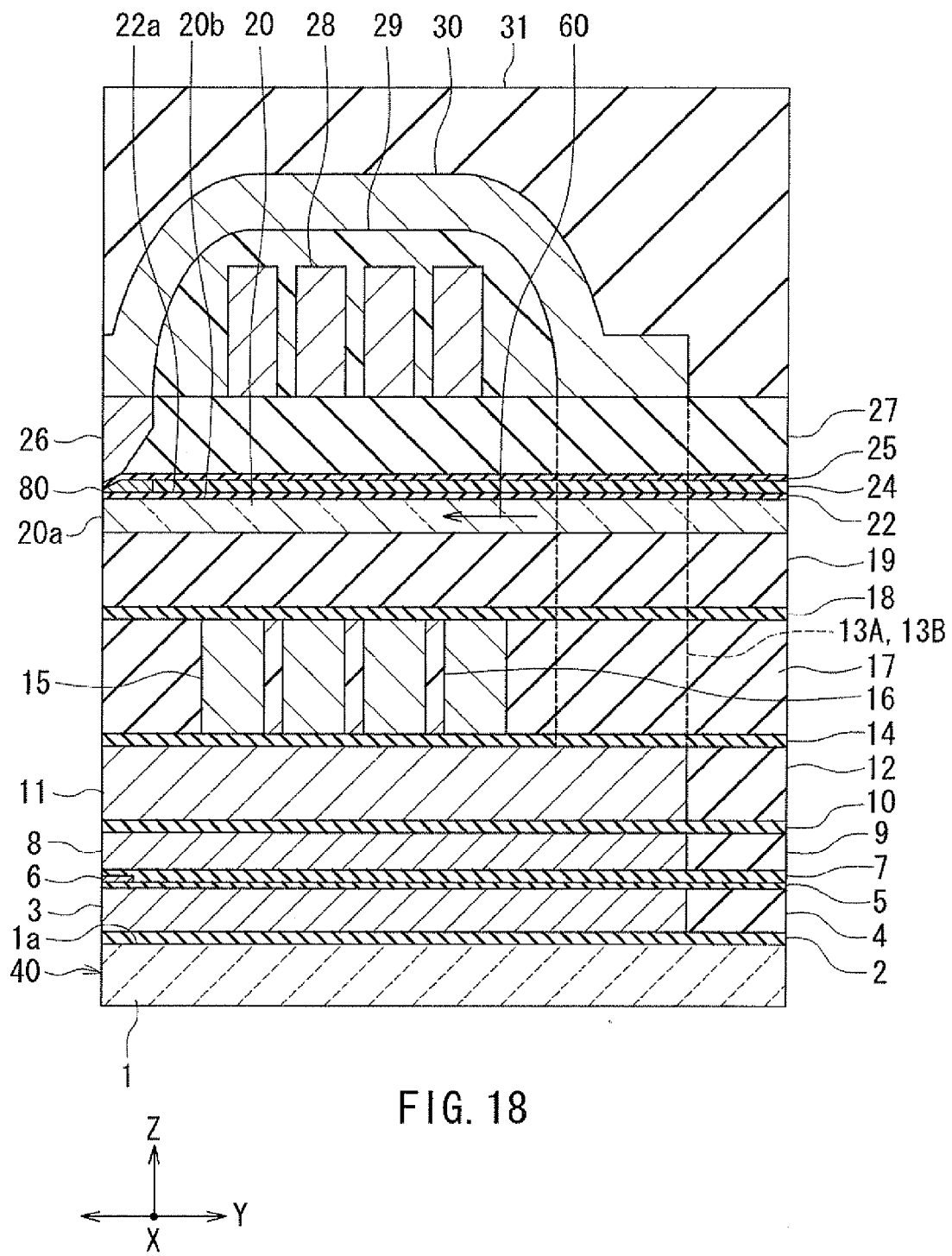
FIG. 18 is a cross-sectional view showing the configuration of the thermally-assisted magnetic recording head according to the second embodiment of the invention.

Reference is now made to FIG. 17 and FIG. 18 to describe a thermally-assisted magnetic recording head according to a second embodiment of the invention. FIG. 17 is a perspective view showing the main part of the thermally-assisted magnetic recording head. FIG. 18 is a cross-sectional view showing the configuration of the thermally-assisted magnetic recording head. The thermally-assisted magnetic recording head according to the present embodiment has a plasmon generator 80 according to the present embodiment, in place of the plasmon generator 50 according to the first embodiment. The thermally-assisted magnetic recording head further has dielectric layers 24 and 25 in place of the dielectric layer 23 of the first embodiment.

The plasmon generator 80 is disposed on the top surface 22a of the gap layer 22 in the vicinity of the medium facing surface 40. The dielectric layer 24 is disposed on the top surface 22a of the gap layer 22 and surrounds the plasmon generator 80. The dielectric layer 25 is disposed over the plasmon generator 80 and the dielectric layer 24. The dielectric layers 24 and 25 are made of alumina or $SiO_2$, for example.

The plasmon generator 80 has a front end face 80a located in the medium facing surface 40. The front end face 80a includes a near-field light generating part 80g that generates near-field light based on surface plasmons. The plasmon generator 80 includes a first portion 81 made of a first metal material and a second portion 82 made of a second metal material different from the first metal material. In the present embodiment, the first portion 81 is located away from the medium facing surface 40 so as not to be exposed in the front end face 80a. The second portion 82 is located between the first portion 81 and the medium facing surface 40.

The outer surface of the first portion 81 includes an end face 81a that is closer to the medium facing surface 40, a top surface 81b, and a bottom surface 81c that faces the top surface 20b of the core 20 with a predetermined spacing therebetween. In the present embodiment, the end face 81a is located away from the medium facing surface 40. The first portion 81 includes a propagation part 811 including the end face 81a, and a width changing portion 812 that is located farther from the medium facing surface 40 than is the propagation part 811. The top surface 81b includes a first surface that is formed by the top surface of the propagation part 811, and a second surface that is formed by the top surface of the width changing portion 812. The bottom surface 81c includes a third surface that is formed by the bottom surface of the propagation part 811, and a fourth surface that is formed by the bottom surface of the width changing portion 812.

The top surface of the propagation part 811 (the first surface) includes a first inclined portion. The distance from the bottom surface of the propagation part 811 (the third surface) to an arbitrary point on the first inclined portion decreases with decreasing distance from the arbitrary point to the end face 81a. The top surface of the propagation part 811 may include a flat portion that is located farther from the medium facing surface 40 than is the first inclined portion and continuous with the first inclined portion. The flat portion is parallel to the bottom surface of the propagation part 811.

For example, the propagation part 811 is rectangular in cross section parallel to the medium facing surface 40. The width of the propagation part 811 in the X direction may be constant regardless of the distance from the medium facing surface 40 or may decrease with increasing proximity to the medium facing surface 40.

The width changing portion 812 is located on a side of the propagation part 811 farther from the end face 81a and is connected to the propagation part 811. For example, the width changing portion 812 is rectangular in cross section parallel to the medium facing surface 40. The width of the width changing portion 812 in the X direction decreases with increasing proximity to the medium facing surface 40, and becomes equal to the width of the propagation part 811 at the boundary between the propagation part 811 and the width changing portion 812. The width of the bottom surface of the width changing portion 812 (the fourth surface) decreases with increasing proximity to the medium facing surface 40, and becomes equal to the width of the bottom surface of the propagation part 811 (the third surface) at the boundary between the bottom surfaces of the propagation part 811 and the width changing portion 812.

The second portion 82 is located between the medium facing surface 40 and the propagation part 811. The outer surface of the second portion 82 includes an end face 82a that is located in the front end face 80a, a top surface 82b, a bottom surface 82c that faces the top surface 20b of the core 20 with a predetermined spacing therebetween, and an end face 82d that is in contact with the end face 81a of the first portion 81. The top surface 82b is located closer to the medium facing surface 40 than is the top surface 81b of the first portion 81 (the top surface of the propagation part 811) so as to be continuous with the top surface 81b. The bottom surface 82c is located closer to the medium facing surface 40 than is the bottom surface 81c of the first portion 81 (the bottom surface of the propagation part 811) so as to be continuous with the bottom surface 81c. The near-field light generating part 80g lies at an end of the bottom surface 82c. The end face 82a includes the near-field light generating part 80g.

The top surface 82b includes a second inclined portion. The distance from the bottom surface 82c to an arbitrary point on the second inclined portion decreases with decreasing distance from the arbitrary point to the end face 82a. The top surface 82b may include a flat portion that is located closer to the medium facing surface 40 than is the second inclined portion and continuous with the second inclined portion. The flat portion is parallel to the bottom surface 82c.

For example, the second portion 82 is rectangular in cross section parallel to the medium facing surface 40. The width of the second portion 82 in the X direction may be constant regardless of the distance from the medium facing surface 40 or may decrease with increasing proximity to the medium facing surface 40. In either case, the width of the second portion 82 becomes equal to that of the propagation part 811 at the boundary between the second portion 82 and the propagation part 811. The width of the bottom surface 82c becomes equal to that of the bottom surface of the propagation part 811 (the third surface) at the boundary between the bottom surface 82c and the bottom surface of the propagation part 811.

In the example shown in FIG. 17, the propagation part 811 is smaller than the width changing portion 812 and greater than the second portion 82 in length in the direction perpendicular to the front end face 80a (the Y direction). The first portion 81 including the propagation part 811 and the width changing portion 812 is therefore greater in volume than the second portion 82.

An example of the shape of the main pole 26 of the present embodiment will now be described with reference to FIG. 17 and FIG. 18. The main pole 26 of the present embodiment has a front end face located in the medium facing surface 40, a rear end face opposite to the front end face, a bottom surface, a top surface, and two side surfaces. Part of the bottom surface of the main pole 26 is opposed to the first and second inclined portions of the plasmon generator 80 with the dielectric layer 25 interposed therebetween. The distance from the top surface 1a of the substrate 1 to an arbitrary point on the bottom surface of the main pole 26 increases with increasing distance from the arbitrary point to the medium facing surface 40. Note that the shape of the main pole 26 of the present embodiment is not limited to the foregoing example described with reference to FIG. 17 and FIG. 18.

Now, a description will be given of the principle of generation of near-field light in the present embodiment. As has been described in relation to the first embodiment, laser light emitted from a not-shown laser diode enters the core 20. As shown in FIG. 18, the laser light 60 propagates through the core 20 toward the medium facing surface 40, and reaches the vicinity of the plasmon generator 80. The laser light 60 is then totally reflected at the top surface 20b of the core 20. This generates evanescent light permeating into the gap layer 22. As a result, surface plasmons are excited at least on the bottom surface of the width changing portion 812 (the fourth surface) of the plasmon generator 80 through coupling with the evanescent light.

The surface plasmons excited on the bottom surface of the width changing portion 812 propagate through the bottom surface of the width changing portion 812 to reach the bottom surface of the propagation part 811 (the third surface), and further propagates through the bottom surface of the propagation part 811 and the bottom surface 82c of the second portion 82 in succession to reach the near-field light generating part 80g. Consequently, the surface plasmons concentrate at the near-field light generating part 80g, and the near-field light generating part 80g generates near-field light based on the surface plasmons.

A method of manufacturing the thermally-assisted magnetic recording head according to the present embodiment will now be described. The method of manufacturing the thermally-assisted magnetic recording head according to the present embodiment is the same as the method according to the first embodiment up to the step of forming the gap layer 22.

After the formation of the gap layer 22, first, a second metal material film made of the second metal material is formed on the top surface 22a of the gap layer 22 by sputtering, for example. A first photoresist mask is then formed on the second metal material film. The first photoresist mask partially covers the area where the plasmon generator 80 is to be formed. More specifically, the first photoresist mask covers the area where the second portion 82 is to be formed, and does not cover the area where the first portion 81 is to be formed. The first photoresist mask is formed by patterning a photoresist layer by photolithography. Next, the second metal material film except the portion thereof lying under the first photoresist mask is removed by, for example, IBE, using the first photoresist mask as the etching mask.

With the first photoresist mask left unremoved, a first metal material film made of the first metal material is then formed over the entire top surface of the stack by sputtering, for example. The first photoresist mask is then lifted off. Next, a second photoresist mask, whose planar shape corresponds to that of the plasmon generator 80, is formed over the first and second metal material films. The second photoresist mask is formed by patterning a photoresist layer by photolithography. Next, the first and second metal material films except the respective portions lying under the second photoresist mask are removed by, for example, IBE, using the second photoresist mask as the etching mask.

With the second photoresist mask left unremoved, the dielectric layer 24 is then formed over the entire top surface of the stack by sputtering, for example. The second photoresist mask is then lifted off.

Next, the first and second metal material films are partially etched to form the first inclined portion of the top surface of the propagation part 811 and the second inclined portion of the top surface 82b of the second portion 82. In this step, a third photoresist mask is formed first. The third photoresist mask covers at least a portion of the top surface of the first metal material film that is to later become the top surface of the width changing portion 812 (the second surface). The third photoresist mask is formed by patterning a photoresist layer by photolithography. Then, portions of the top surfaces of the first and second metal material films not covered by the third photoresist mask are taper-etched by, for example, IBE, using the third photoresist mask as the etching mask. The first and second inclined portions are thereby formed. The third photoresist mask is then removed. Through the foregoing series of steps, the first metal material film becomes the first portion 81 and the second metal material film becomes the second portion 82. The plasmon generator 80 is thus completed.

Next, the dielectric layer 25 is formed over the entire top surface of the stack. The dielectric layers 24 and 25 are then selectively etched to form therein two openings for exposing the top surfaces of the third layers of the coupling portions 13A and 13B. Then, portions of the gap layer 22 exposed from the two openings of the dielectric layers 24 and 25 are removed by etching. Note that the etching of the gap layer 22 may be performed at the same time as when the dielectric layers 24 and 25 are etched. The fourth layers of the coupling portions 13A and 13B are then formed on the third layers of the coupling portions 13A and 13B. Next, the dielectric layer 27 is formed to cover the fourth layers of the coupling portions 13A and 13B. The dielectric layer 27 is then polished by, for example, CMP, until the fourth layers of the coupling portions 13A and 13B are exposed. Next, the dielectric layer 27 is taper-etched by, for example, RIE or IBE to provide the dielectric layer 27 with an accommodation part for accommodating the main pole 26. The main pole 26 is then formed in the accommodation part of the dielectric layer 27. Next, the coil 28 is formed on the dielectric layer 27. The steps to follow the formation of the coil 28 are the same as in the first embodiment.

The plasmon generator 80 according to the present embodiment includes the first portion 81 formed of the first metal material and the second portion 82 formed of the second metal material different from the first metal material. A combination of metal materials to be used as the first and second metal materials is selected from at least one of the first to third points of view that have been described in relation to the first embodiment. It is thereby possible to obtain the effects described in relation to the first embodiment.

The other effects provided by the plasmon generator 80 according to the present embodiment will now be described. In the present embodiment, the first portion 81 of the plasmon generator 80 includes the propagation part 811 and the width changing portion 812. The width of the bottom surface of the width changing portion 812 (the fourth surface) facing the top surface 20b of the core 20 decreases with increasing proximity to the medium facing surface 40, and becomes equal to the width of the bottom surface of the propagation part 811 (the third surface) at the boundary between the bottom surfaces of the propagation part 811 and the width changing portion 812. The present embodiment allows the bottom surface of the plasmon generator 80 facing the top surface 20b of the core 20 to be larger in area to allow more surface plasmons to be excited than in the case where the width changing portion 812 is not provided.

As the plasmon generator 80 is reduced in thickness (dimension in the Z direction), the excitation efficiency of surface plasmons is decreased to cause less surface plasmons to be excited. For this reason, the thickness of the plasmon generator 80 is preferably increased to some extent. In the present embodiment, the top surface of the propagation part 811 (the first surface) includes the first inclined portion, and the top surface 82b of the second portion 82 includes the second inclined portion. According to the present embodiment, it is thereby possible to reduce the dimension of the front end face 80a (the end face 82a) in the Z direction while increasing the thickness of a portion of the plasmon generator 80 away from the medium facing surface 40. Consequently, according to the present embodiment, it is possible to produce near-field light having a small spot diameter and sufficient intensity.

The remainder of configuration, function and effects of the present embodiment are similar to those of the first embodiment.

Third Embodiment

Figure 19:
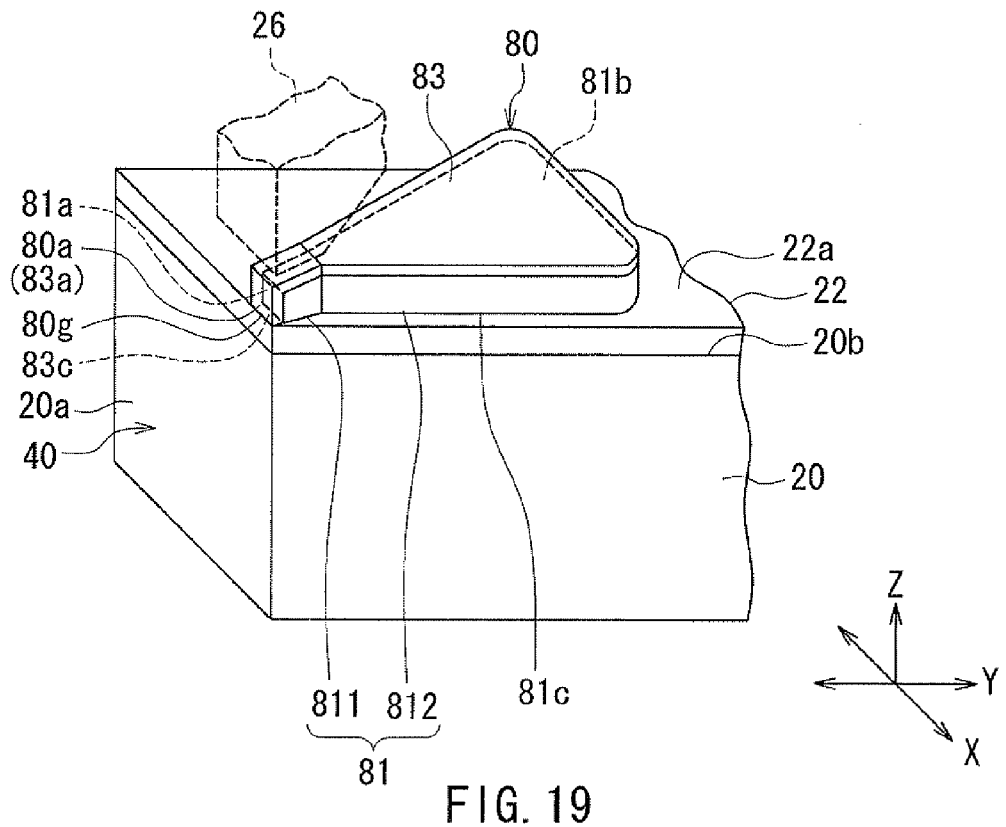
FIG. 19 is a perspective view showing the main part of a thermally-assisted magnetic recording head according to a third embodiment of the invention.

Reference is now made to FIG. 19 to describe a plasmon generator according to a third embodiment of the invention. FIG. 19 is a perspective view showing the main part of the thermally-assisted magnetic recording head. The plasmon generator 80 according to the present embodiment is different from the plasmon generator 80 according to the second embodiment in the following respects. The plasmon generator 80 according to the present embodiment has a second portion 83 in place of the second portion 82 of the second embodiment. The second portion 83 is formed along the end face 81a and the top surface 81b of the first portion 81. In the present embodiment, in particular, the second portion 83 covers the entirety of the end face 81a.

The outer surface of the second portion 83 includes a first end face 83a and a second end face 83c. The first end face 83a is located in the front end face 80a. The second end face 83c faces the top surface 20b of the core 20 with a predetermined spacing therebetween and is located closer to the medium facing surface 40 than is the bottom surface 81c of the first portion 81 (the bottom surface of the propagation part 811) so as to be continuous with the bottom surface 81c. The near-field light generating part 80g lies at an end of the second end face 83c. The first end face 83a includes the near-field light generating part 80g.

As viewed from above, the positions of the outer edges of the second portion 83, except for those between the end face 81a of the first portion 81 and the medium facing surface 40, coincide with or are close to the positions of the outer edges of the first portion 81. In the example shown in FIG. 19, the thickness (dimension in the Z direction) of the first portion 81 is greater than that of a part of the second portion 83 that lies on the first portion 81. As shown in FIG. 19, a part of the second portion 83 that lies in the region between the end face 81a of the first portion 81 and the medium facing surface 40 is much smaller in volume than the first portion 81. The first portion 81 is therefore greater in volume than the second portion 83.

The remainder of configuration, function and effects of the present embodiment are similar to those of the second embodiment.

Fourth Embodiment

Figure 20:
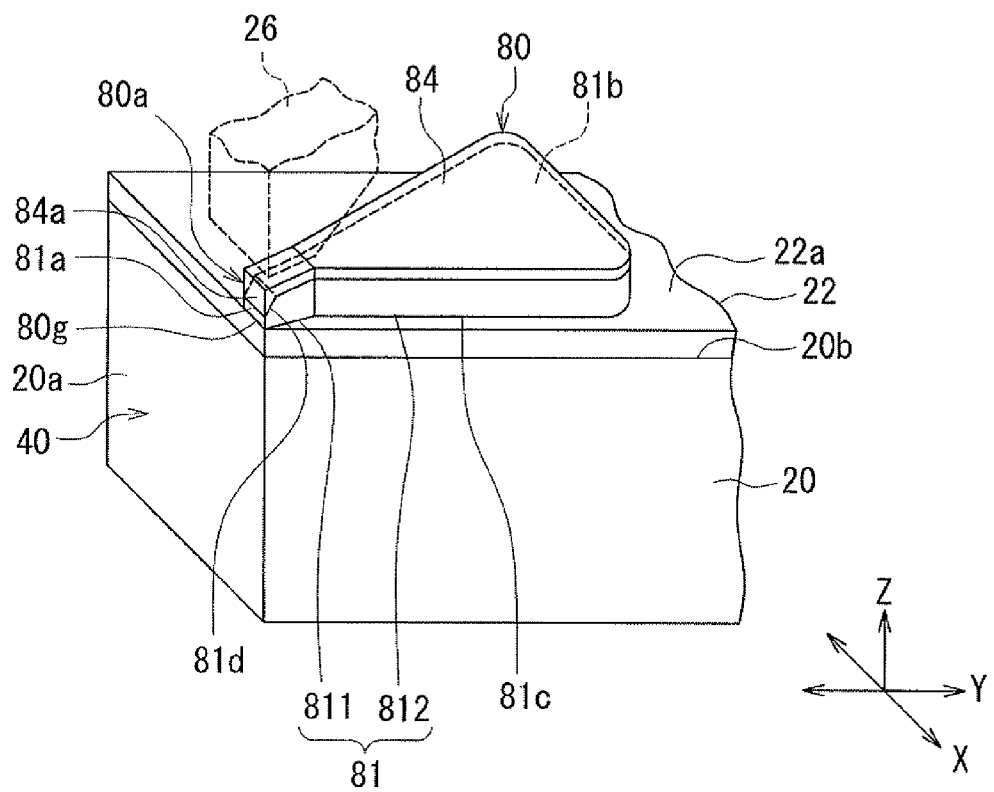
FIG. 20 is a perspective view showing the main part of a thermally-assisted magnetic recording head according to a fourth embodiment of the invention.

Reference is now made to FIG. 20 to describe a plasmon generator according to a fourth embodiment of the invention. FIG. 20 is a perspective view showing the main part of the thermally-assisted magnetic recording head. The plasmon generator 80 according to the present embodiment is different from the plasmon generator 80 according to the third embodiment in the following respects. In the present embodiment, the outer surface of the first portion 81 includes an inclined surface 81d in addition to the end face 81a, the top surface 81b and the bottom surface 81c. The inclined surface 81d connects the end of the top surface 81b closest to the front end face 80a and the top end of the end face 81a to each other. The distance from the medium facing surface 40 to an arbitrary point on the inclined surface 81d increases with increasing distance from the arbitrary point to the bottom surface 81c of the first portion 81. In the present embodiment, the end face 81a is located in the front end face 80a. Consequently, in the present embodiment the first portion 81 is exposed in the front end face 80a. The near-field light generating part 80g lies at the bottom end of the end face 81a.

The plasmon generator 80 according to the present embodiment has a second portion 84 in place of the second portion 83 of the third embodiment. The second portion 84 is formed along the inclined surface 81d and the top surface 81b of the first portion 81. The outer surface of the second portion 84 includes an end face 84a located in the front end face 80a.

As viewed from above, the positions of the outer edges of the second portion 84 coincide with or are close to the positions of the outer edges of the first portion 81. In the example shown in FIG. 20, the maximum thickness (dimension in the Z direction) of the first portion 81 is greater than the thickness of a part of the second portion 84 that lies on the inclined surface 81d. As shown in FIG. 20, the part of the second portion 84 lying on the inclined surface 81d is much smaller in volume than the first portion 81. The first portion 81 is therefore greater in volume than the second portion 84.

In the present embodiment, the near-field light generating part 80g is included in the end face 81a of the first portion 81 located in the front end face 80a, not in the end face 84a of the second portion 84 located in the front end face 80a.

In the present embodiment also, a combination of metal materials to be used as the first and second metal materials is selected from at least one of the first to third points of view that have been described in relation to the first embodiment.

In the present embodiment, the end face 81a of the first portion 81, in addition to the end face 84a of the second portion 84, is exposed in the front end face 80a. However, the area of the first metal material exposed in the front end face 80a is smaller than that in the case of a plasmon generator formed entirely of the first metal material (this plasmon generator will hereinafter be referred to as the plasmon generator of a comparative example). The present embodiment therefore provides features that are not achievable by the plasmon generator of the comparative example which is formed entirely of a single material (the first metal material). More specifically, where a combination of metal materials to be used as the first and second metal materials is selected from the first point of view, it is possible to prevent the occurrence of corrosion in the front end face 80a and its vicinity more effectively as compared with the case of the plasmon generator of the comparative example. Where a combination of metal materials to be used as the first and second metal materials is selected from the second point of view, it is possible to adjust (control) the intensity of the near-field light generated from the near-field light generating part 80g because the second portion 84 is present in the vicinity of the front end face 80a. Where a combination of metal materials to be used as the first and second metal materials is selected from the third point of view, it is possible to provide the front end face 80a and its vicinity with higher mechanical strength to allow the prevention of mechanical damage to the plasmon generator 80 more effectively, as compared with the case of the plasmon generator of the comparative example.

The remainder of configuration, function and effects of the present embodiment are similar to those of the third embodiment.

Fifth Embodiment

Figure 21:
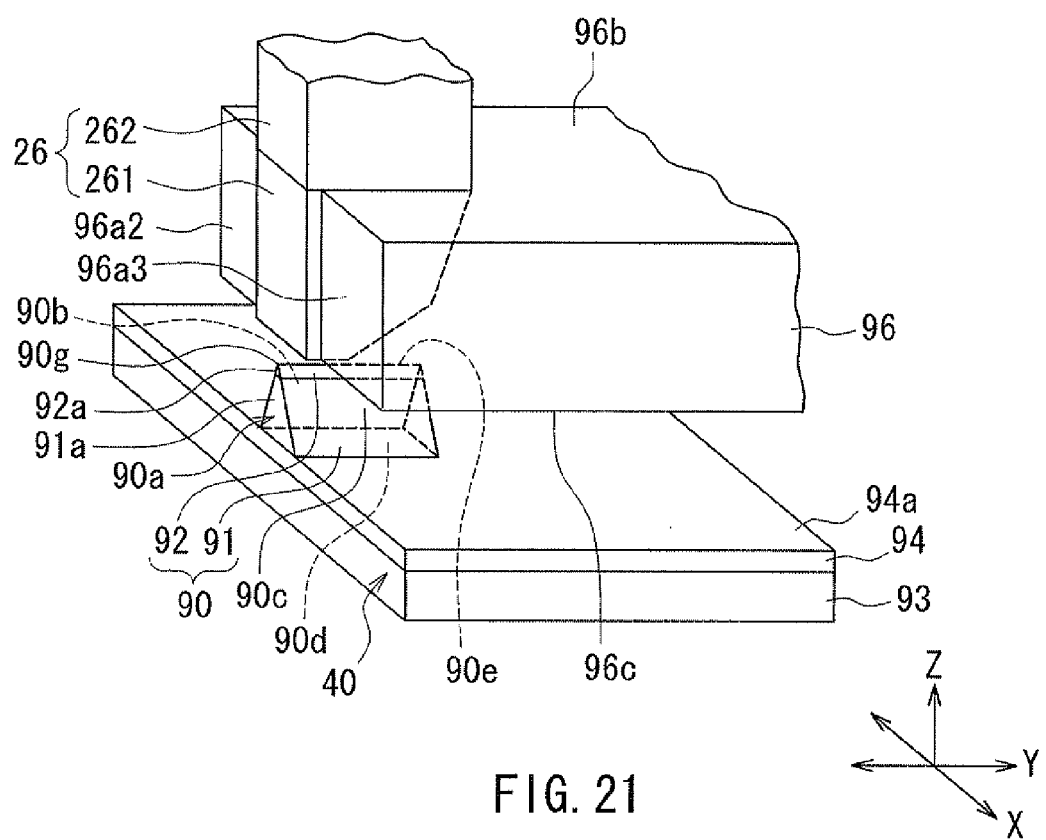
FIG. 21 is a perspective view showing the main part of a thermally-assisted magnetic recording head according to a fifth embodiment of the invention.
Figure 22:
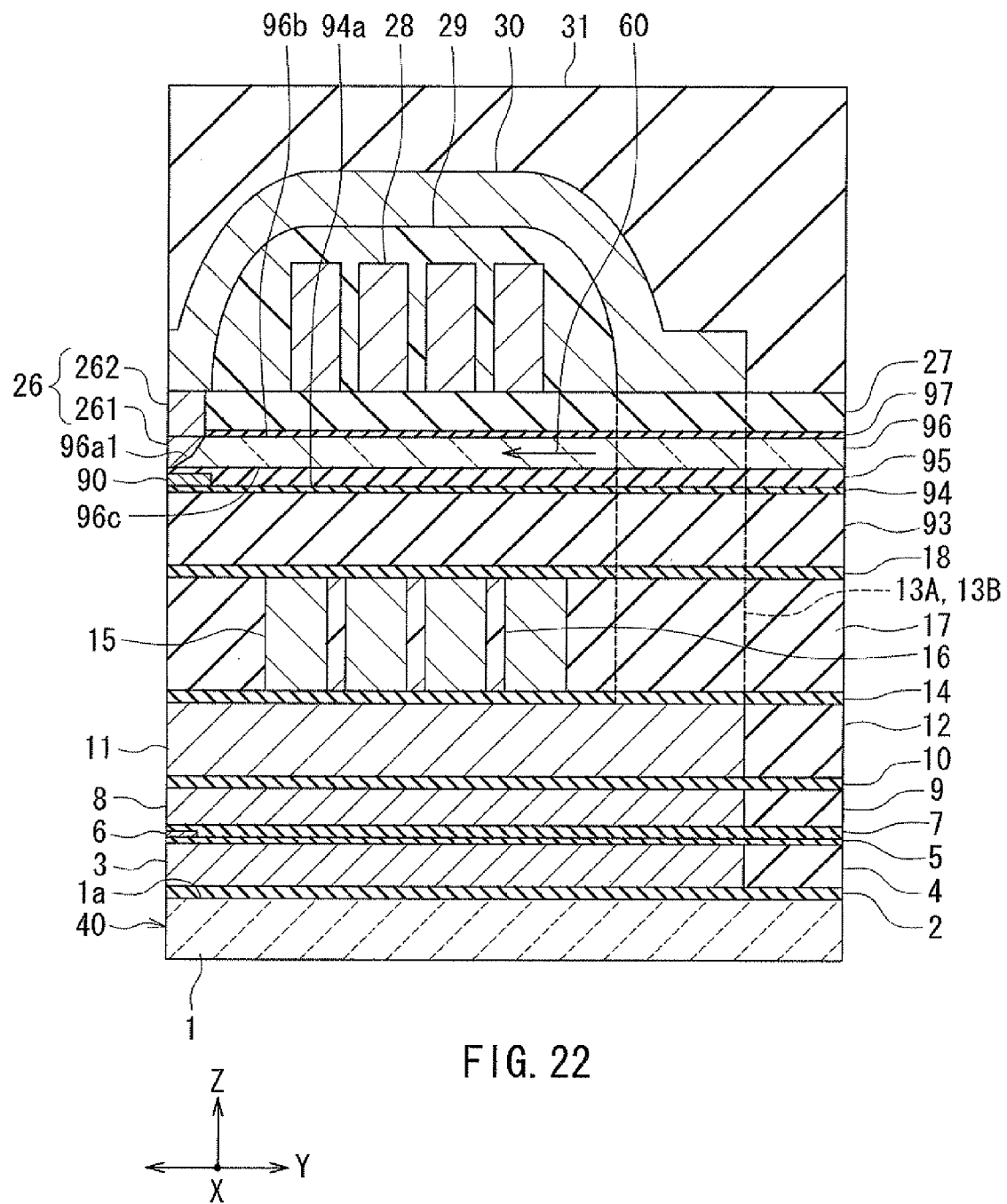
FIG. 22 is a cross-sectional view showing the configuration of the thermally-assisted magnetic recording head according to the fifth embodiment of the invention.

Reference is now made to FIG. 21 and FIG. 22 to describe a thermally-assisted magnetic recording head according to a fifth embodiment of the invention. FIG. 21 is a perspective view showing the main part of the thermally-assisted magnetic recording head. FIG. 22 is a cross-sectional view showing the configuration of the thermally-assisted magnetic recording head. The thermally-assisted magnetic recording head according to the present embodiment includes a plasmon generator 90 according to the present embodiment and a waveguide of the present embodiment, in place of the plasmon generator 50 according to the first embodiment and the waveguide of the first embodiment. The dielectric layer 23 is not provided in the present embodiment.

The thermally-assisted magnetic recording head according to the present embodiment further includes a dielectric layer 93 disposed on the insulating layer 18 and a dielectric layer 94 disposed on the dielectric layer 93. The dielectric layer 94 has a top surface 94a. The plasmon generator 90 is disposed on the top surface 94a of the dielectric layer 94. The main pole 26 of the present embodiment includes a first layer 261 disposed above the plasmon generator 90 and a second layer 262 disposed on the first layer 261. The dielectric layer 93 is made of SiO$_2$, for example. The dielectric layer 94 is made of alumina, for example. The plasmon generator 90 will be described in detail later.

The waveguide of the present embodiment includes a core 96, and a cladding that surrounds the core 96. The cladding includes a first cladding layer 95, a second cladding layer (not shown), and a third cladding layer 97. The cladding layer 95 is disposed to cover the plasmon generator 90 and the top surface 94a of the dielectric layer 94. The first layer 261 and the core 96 are disposed on the cladding layer 95. The second cladding layer is disposed on the cladding layer 95 and surrounds the first layer 261 and the core 96. The third cladding layer 97 is disposed over the core 96 and the second cladding layer. Materials usable for the first cladding layer 95, the second cladding layer, and the third cladding layer 97 are the same as those for the cladding layers 19 and 21 and the gap layer 22 of the first embodiment.

The core 96 has end faces 96a1, 96a2, and 96a3 that face toward the medium facing surface 40 and are located away from the medium facing surface 40. The core 96 further has a top surface 96b and a bottom surface 96c. The end faces 96a2 and 96a3 are located on opposite sides of the end face 96a1 in the track width direction (the X direction). The first layer 261 is located between the end face 96a1 and the medium facing surface 40. The core 96 is made of the same material as that of the core 20 of the first embodiment.

In the present embodiment, the dielectric layer 27 is disposed on the cladding layer 97 and surrounds the second layer 262. The second layers of the coupling portions 13A and 13B are embedded in the insulating layer 18 and the dielectric layer 93. The third layers of the coupling portions 13A and 13B are embedded in the dielectric layer 94, the cladding layer 95 and the second cladding layer. The third layer of the coupling portion 13A and the third layer of the coupling portion 13B are located on opposite sides of the core 96 in the track width direction (the X direction) and are each spaced from the core 96. The fourth layers of the coupling portions 13A and 13B are embedded in the cladding layer 97 and the dielectric layer 27.

Reference is now made to FIG. 21 and FIG. 22 to describe the plasmon generator 90 in detail. The plasmon generator 90 is triangular-prism-shaped. The plasmon generator 90 has a front end face 90a located in the medium facing surface 40, a rear end face opposite to the front end face, two inclined surfaces 90b and 90c, and a bottom surface 90d. The front end face 90a includes a near-field light generating part 90g that generates near-field light based on surface plasmons. The bottom surface 90d connects the two inclined surfaces 90b and 90c to each other. Each of the two inclined surfaces 90b and 90c is inclined with respect to the direction perpendicular to the top surface 1a of the substrate 1.

The plasmon generator 90 further has an edge part 90e that connects the two inclined surfaces 90b and 90c to each other. The near-field light generating part 90g lies at an end of the edge part 90e. The distance between the two inclined surfaces 90b and 90c decreases toward the edge part 90e. The edge part 90e faces the bottom surface 96c of the core 96 and the bottom surface of the first layer 261 with a predetermined spacing between the edge part 89e and those bottom surfaces, and extends in the direction perpendicular to the medium facing surface 40 (the Y direction).

The front end face 90a is triangular in shape. One of the vertexes of the front end face 90a lies at an end of the edge part 90e. The vertex constitutes the near-field light generating part 90g.

The length of the plasmon generator 90 in the direction perpendicular to the medium facing surface 40 (the Y direction) is greater than the length of the front end face 90a in the direction perpendicular to the top surface 1a of the substrate 1 (the Z direction). The width and the Z-direction length of the bottom end of the front end face 90a are both equal to or smaller than the wavelength of the light to propagate through the core 96, and fall within the range of 100 to 500 nm, for example. The length of the plasmon generator 90 in the Y direction falls within the range of 0.25 to 2.5 μm, for example. The distance between the edge part 90e and the bottom surface 96c of the core 96 falls within the range of 10 to 50 nm, for example.

The plasmon generator 90 includes a first portion 91 formed of a first metal material and a second portion 92 formed of a second metal material different from the first metal material. The second portion 92 is in the shape of a triangular prism including the edge part 90e. The first portion 91 has such a shape that the second portion 92 is eliminated from the plasmon generator 90. Any cross section of the first portion 91 parallel to the medium facing surface 40 is trapezoidal in shape.

The outer surface of the first portion 91 includes an end face 91a located in the front end face 90a, a first inclined surface constituting part of the inclined surface 90b, and a second inclined surface constituting part of the inclined surface 90c. The outer surface of the second portion 92 includes an end face 92a located in the front end face 90a, a third inclined surface constituting another part of the inclined surface 90b, and a fourth inclined surface constituting another part of the inclined surface 90c. The end face 92a includes the near-field light generating part 90g. The angle formed between the third inclined surface and the fourth inclined surface is equal or nearly equal to the angle formed between the first inclined surface and the second inclined surface.

In the example shown in FIG. 21, the first portion 91 is greater than the second portion 92 in height (dimension in the Z direction). The first portion 91 therefore has a volume greater than that of the second portion 92.

Now, with reference to FIG. 21 and FIG. 22, an example of the shape of the main pole 26 of the present embodiment will be described. The first layer 261 of the main pole 26 has a front end face located in the medium facing surface 40, a rear end face opposite to the front end face, a bottom surface, a top surface, and two side surfaces. The cladding layer 95 is interposed between a portion of the bottom surface of the first layer 261 located near the medium facing surface 40 and the edge part 90e of the plasmon generator 90. The distance from the top surface 1a of the substrate 1 to an arbitrary point on another portion of the bottom surface of the first layer 261 increases with increasing distance from the arbitrary point to the medium facing surface 40.

The second layer 262 of the main pole 26 has a front end face located in the medium facing surface 40, a rear end face opposite to the front end face, a bottom surface in contact with the top surface of the first layer 261, a top surface, and two side surfaces. The bottom surface of the yoke layer 30 of the present embodiment is in contact with the top surface of the second layer 262.

The shape of the main pole 26 of the present embodiment is not limited to the foregoing example described with reference to FIG. 21 and FIG. 22.

Now, a description will be given of the principle of generation of near-field light in the present embodiment. As has been described in relation to the first embodiment, laser light emitted from a not-shown laser diode enters the core 96. As shown in FIG. 22, the laser light 60 propagates through the core 96 toward the medium facing surface 40, and reaches the vicinity of the plasmon generator 90. The laser light 60 is then totally reflected at the bottom surface 96c of the core 96. This generates evanescent light permeating into the cladding layer 95. Then, surface plasmons are excited on at least the edge part 90e and a portion of the outer surface of the plasmon generator 90 in the vicinity of the edge part 90e through coupling with the evanescent light. The portion of the outer surface of the plasmon generator 90 in the vicinity of the edge part 90e includes the third and fourth inclined surfaces of the second portion 92 and portions of the first and second inclined surfaces of the first portion 91 close to the second portion 92.

The surface plasmons excited as described above propagate along the edge part 90e and the portion of the outer surface of the plasmon generator 90 in the vicinity of the edge part 90e to reach the near-field light generating part 90g. As a result, the surface plasmons concentrate at the near-field light generating part 90g, and the near-field light generating part 90g generates near-field light based on the surface plasmons.

In the present embodiment also, a combination of metal materials to be used as the first and second metal materials is selected from at least one of the first to third points of view that have been described in relation to the first embodiment.

In the present embodiment, the end face 91a of the first portion 91, in addition to the end face 92a of the second portion 92, is exposed in the front end face 90a. Nevertheless, the present embodiment provides features that are not achievable by the plasmon generator of the comparative example which is formed entirely of a single material (the first metal material). More specifically, where a combination of metal materials to be used as the first and second metal materials is selected from the first point of view, it is possible to prevent the occurrence of corrosion at the near-field light generating part 90g and its vicinity, which are most likely to become hot, more effectively than in the case of the plasmon generator of the comparative example. Where a combination of metal materials to be used as the first and second metal materials is selected from the second point of view, it is possible to adjust (control) the intensity of the near-field light generated from the near-field light generating part 90g because the second portion 92 is present in the vicinity of the near-field light generating part 90g. Where a combination of metal materials to be used as the first and second metal materials is selected from the third point of view, it is possible to provide the near-field light generating part 90g and its vicinity with higher mechanical strength to thereby prevent mechanical damage thereto more effectively than in the case of the plasmon generator of the comparative example.

A method of manufacturing the thermally-assisted magnetic recording head according to the present embodiment will now be described. The method of manufacturing the thermally-assisted magnetic recording head according to the present embodiment is the same as the method according to the first embodiment up to the step of forming the insulating layer 18.

Now, a description will be given of the steps to be performed after the formation of the insulating layer 18 until the formation of the dielectric layer 27. In the step following the formation of the insulating layer 18, first, the insulating layer 18 is selectively etched to form therein two openings for exposing the top surfaces of the first layers of the coupling portions 13A and 13B. The second layers of the coupling portions 13A and 13B are then formed on the first layers of the coupling portions 13A and 13B. Next, the dielectric layer 93 is formed to cover the second layers of the coupling portions 13A and 13B. The dielectric layer 93 is then polished by, for example, CMP, until the second layers of the coupling portions 13A and 13B are exposed. Next, the dielectric layer 94 is formed over the dielectric layer 93 and the second layers of the coupling portions 13A and 13B. The plasmon generator 90 and the cladding layer 95 are then formed on the dielectric layer 94. The process for forming the plasmon generator 90 and the cladding layer 95 will be described in detail later.

Next, a core material layer, which is to later become the core 96, is formed on the cladding layer 95. The cladding layer 95 is then selectively etched to form therein two openings for exposing the top surfaces of the second layers of the coupling portions 13A and 13B. Then, portions of the dielectric layer 94 exposed from the two openings of the cladding layer 95 are removed by etching. Note that the etching of the dielectric layer 94 may be performed at the same time as when the cladding layer 95 is etched. The third layers of the coupling portions 13A and 13B are then formed on the second layers of the coupling portions 13A and 13B. Next, the second cladding layer is formed to cover the core material layer and the third layers of the coupling portions 13A and 13B. The second cladding layer is then polished by, for example, CMP, until the core material layer and the third layers of the coupling portions 13A and 13B are exposed.

Next, the core material layer is taper-etched by, for example, RIE or IBE to provide the core material layer with the end face 96a1. The core material layer thereby becomes the core 96. The second cladding layer is also etched to form in the core 96 and the second cladding layer an accommodation part for accommodating the first layer 261 of the main pole 26. The first layer 261 is then formed in the accommodation part in the core 96 and the second cladding layer. Next, the cladding layer 97 is formed over the entire top surface of the stack. The cladding layer 97 is then selectively etched to form therein an opening for exposing the top surface of the first layer 261 and two openings for exposing the top surfaces of the third layers of the coupling portions 13A and 13B. Next, the second layer 262 is formed on the first layer 261, and the fourth layers of the coupling portions 13A and 13B are formed on the third layers of the coupling portions 13A and 13B. Then, the dielectric layer 27 is formed to cover the second layer 262 and the fourth layers of the coupling portions 13A and 13B. The dielectric layer 27 is then polished by, for example, CMP, until the second layer 262 and the fourth layers of the coupling portions 13A and 13B are exposed. The steps to follow the formation of the dielectric layer 27 are the same as in the first embodiment.

The process for forming the plasmon generator 90 and the cladding layer 95 will now be described in detail with reference to FIG. 23 to FIG. 29. FIG. 23 to FIG. 29 each show a cross section of a stack of layers formed in the process of manufacturing the thermally-assisted magnetic recording head, the cross section being taken at the position where the medium facing surface 40 is to be formed.

Figure 23:
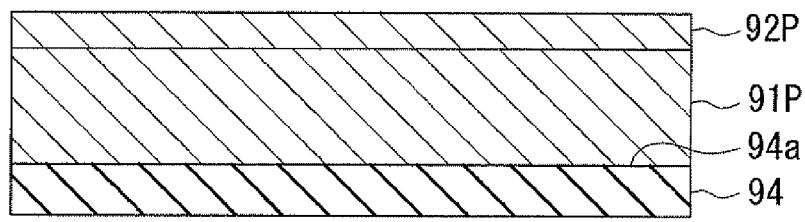
FIG. 23 is a cross-sectional view showing a step of a method of manufacturing the thermally-assisted magnetic recording head according to the fifth embodiment of the invention.

FIG. 23 shows a step that follows the formation of the dielectric layer 94. In this step, first, a first metal layer 91P made of the first metal material is formed on the top surface 94a of the dielectric layer 94 by sputtering, for example. Next, a second metal layer 92P made of the second metal material is formed on the first metal layer 91P by sputtering, for example.

Figure 24:
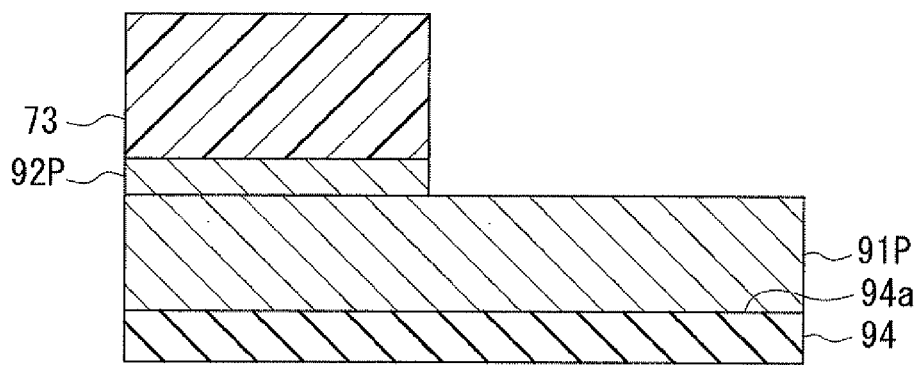
FIG. 24 is a cross-sectional view showing a step that follows the step shown in FIG. 23.

FIG. 24 shows the next step. In this step, first, a photoresist mask 73 is formed on the second metal layer 92P. The photoresist mask 73 is formed by patterning a photoresist layer by photolithography. The photoresist mask 73 covers an area of the second metal layer 92P where the third inclined surface is to be formed later. The second metal layer 92P is then etched by, for example, IBE, using the photoresist mask 73 as the etching mask. The second metal layer 92P thus etched covers an area of the first metal layer 91P where the first inclined surface is to be formed later.

Figure 25:
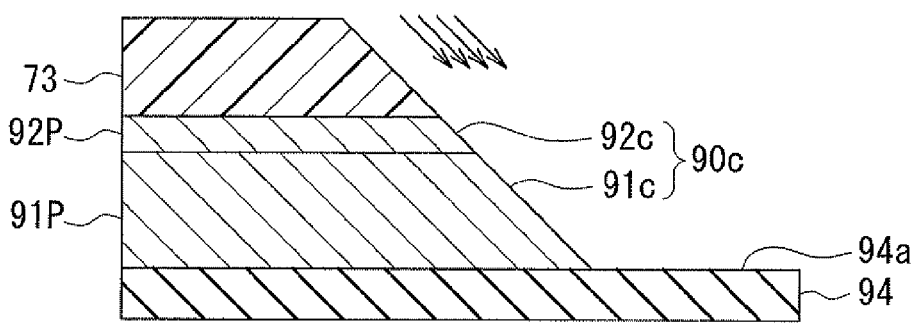
FIG. 25 is a cross-sectional view showing a step that follows the step shown in FIG. 24.

FIG. 25 shows the next step. In this step, the first and second metal layers 91P and 92P are etched by, for example, IBE, using the photoresist mask 73 as the etching mask. This step is performed such that the angle of the traveling direction of the ion beam with respect to the direction perpendicular to the top surface 94a of the dielectric layer 94 is equal to the angle that the inclined surface 90c of the plasmon generator 90 forms with respect to the top surface 94a of the dielectric layer 94. This provides the first metal layer 91P with the second inclined surface 91c and provides the second metal layer 92P with the fourth inclined surface 92c. The photoresist mask 73 is then removed.

Figure 26:
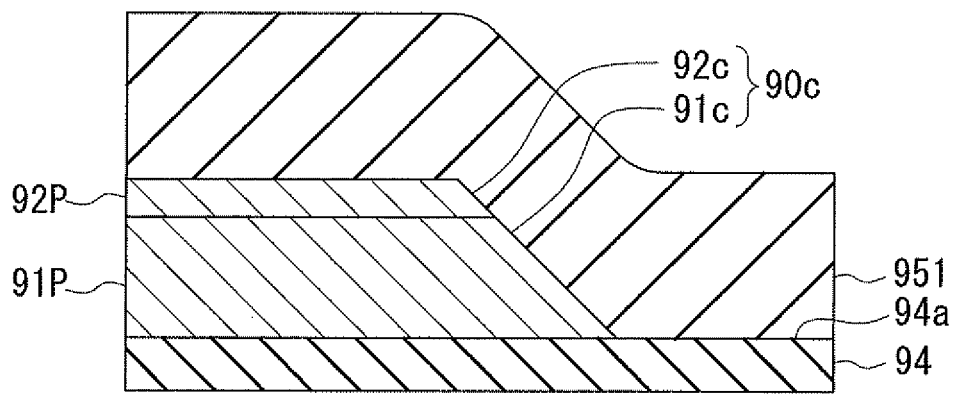
FIG. 26 is a cross-sectional view showing a step that follows the step shown in FIG. 25.
Figure 26:
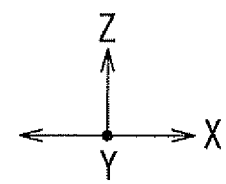

FIG. 26 shows the next step. In this step, a coating layer 951 is formed to cover the first metal layer 91P having the second inclined surface 91c and the second metal layer 92P having the fourth inclined surface 92c. The coating layer 951 is formed also on the top surface 94a of the dielectric layer 94. The coating layer 951 is formed into such a thickness that the top surface of the portion of the coating layer 951 formed on the top surface 94a of the dielectric layer 94 is at a level higher than the top surface of the second metal layer 92P.

Figure 27:
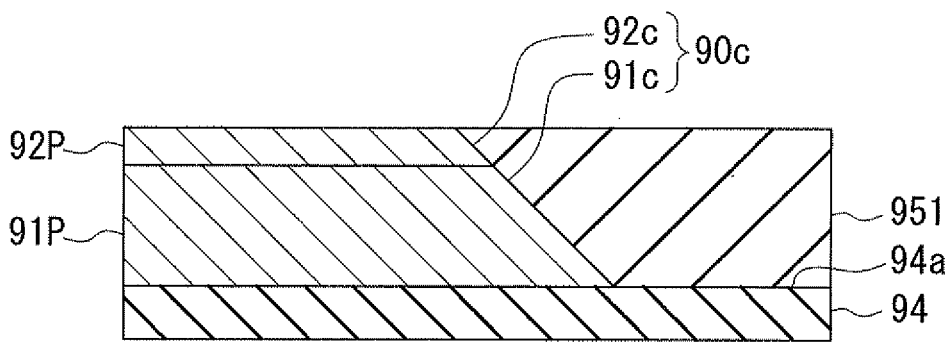
FIG. 27 is a cross-sectional view showing a step that follows the step shown in FIG. 26.
Figure 27:
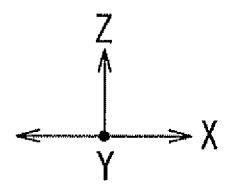

FIG. 27 shows the next step. In this step, the coating layer 951 is polished by, for example, CMP, until the second metal layer 92P is exposed.

Figure 28:
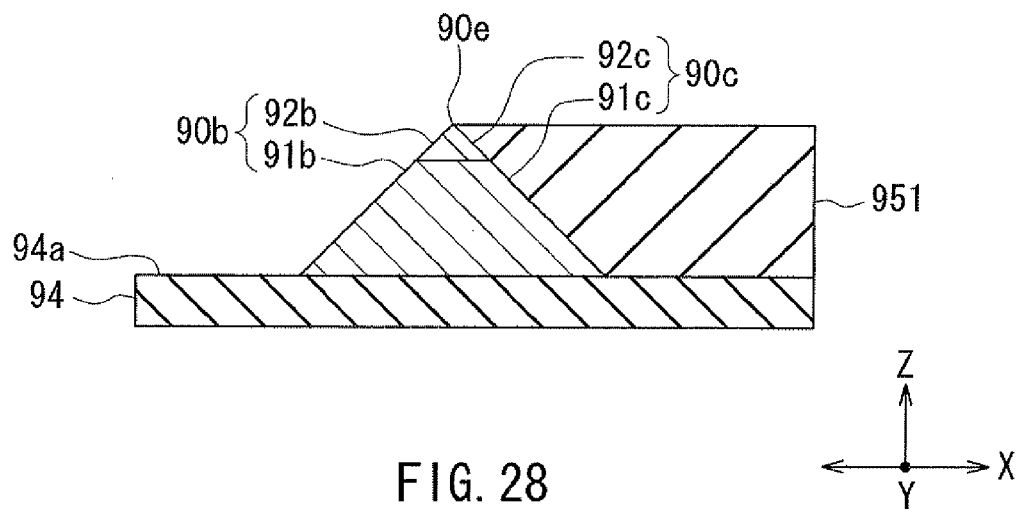
FIG. 28 is a cross-sectional view showing a step that follows the step shown in FIG. 27.

FIG. 28 shows the next step. In this step, first, a not-shown photoresist mask is formed on the second metal layer 92P. The photoresist mask is formed by patterning a photoresist layer by photolithography. The first and second metal layers 91P and 92P are then etched by, for example, IBE, using the photoresist mask as the etching mask. This step is performed such that the angle of the traveling direction of the ion beam with respect to the direction perpendicular to the top surface 94a of the dielectric layer 94 is equal to the angle that the inclined surface 90b of the plasmon generator 90 forms with respect to the top surface 94a of the dielectric layer 94. This forms the edge part 90e of the plasmon generator 90, and provides the first metal layer 91P with the first inclined surface 91b and the second metal layer 92P with the third inclined surface 92b. The photoresist mask is then removed. This step makes the metal layers 91P and 92P into the first portion 91 and the second portion 92, respectively, and thereby completes the plasmon generator 90.

Figure 29:
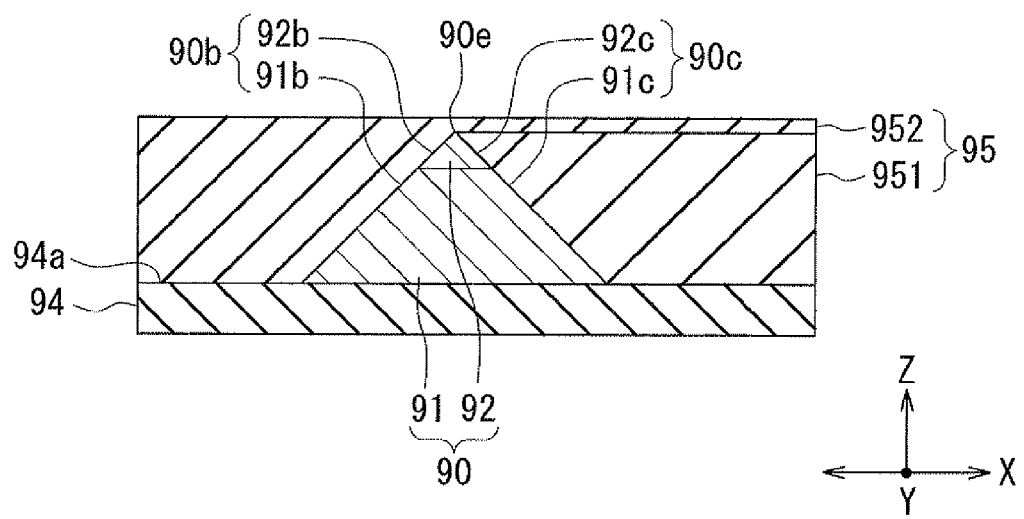
FIG. 29 is a cross-sectional view showing a step that follows the step shown in FIG. 28.

FIG. 29 shows the next step. In this step, a second coating layer 952 is formed to cover the plasmon generator 90 and the coating layer 951. The second coating layer 952 is formed also on the top surface 94a of the dielectric layer 94. The second coating layer 952 is formed into such a thickness that the top surface of the portion of the second coating layer 952 formed on the top surface 94a of the dielectric layer 94 is at a level higher than the top surface of the coating layer 951. The second coating layer 952 is then polished by, for example, CMP, so as to flatten the top surface of the second coating layer 952. The coating layer 951 and the second coating layer 952 having undergone this step constitute the cladding layer 95.

The plasmon generator 90 and the cladding layer 95 are formed through the series of steps shown in FIG. 23 to FIG. 29.

The remainder of configuration, function and effects of the present embodiment are similar to those of the first embodiment.

The present invention is not limited to the foregoing embodiments, and various modifications may be made thereto. For example, the shape and configuration of the plasmon generator are not limited to those exemplified in the foregoing embodiments and can be freely selected, so long as the requirements of the claims are met.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A plasmon generator configured to excite a surface plasmon through coupling with evanescent light, comprising:
   a first portion formed of a first metal material; and
   a second portion formed of a second metal material different from the first metal material, wherein
   the plasmon generator has a front end face, the front end face including a near-field light generating part that generates near-field light based on the surface plasmon,
   the second portion includes an end face located in the front end face,
   the first portion is not exposed in the front end face, and
   the first portion has a length of 150 to 200 nm in a direction perpendicular to the front end face, and the second portion has a length of 2 to 80 nm in the direction perpendicular to the front end face.

2. The plasmon generator according to claim 1, wherein the end face of the second portion located in the front end face includes the near-field light generating part.

3. The plasmon generator according to claim 1, wherein the first portion is greater than the second portion in volume.

4. The plasmon generator according to claim 1, wherein the first metal material is one of Ag, Au, Al, and Cu.

5. The plasmon generator according to claim 1, wherein the second metal material has an ionization tendency lower than that of the first metal material.

6. The plasmon generator according to claim 1, wherein the second metal material has an electrical conductivity lower than that of the first metal material.

7. The plasmon generator according to claim 1, wherein the second metal material has a Vickers hardness higher than that of the first metal material.

8. A thermally-assisted magnetic recording head comprising:
   a medium facing surface that faces a recording medium;
   a main pole that produces a write magnetic field for writing data on the recording medium;
   a waveguide including a core through which light propagates, and a cladding that surrounds the core; and
   a plasmon generator configured to excite a surface plasmon through coupling with evanescent light, the evanescent light occurring from the core based on the light propagating through the core, the plasmon generator including:
a first portion formed of a first metal material; and
a second portion formed of a second metal material different from the first metal material, wherein
the plasmon generator has a front end face located in the medium facing surface, the front end face including a near-field light generating part that generates near-field light based on the surface plasmon,
the second portion includes an end face located in the front end face,
the first portion is not exposed in the front end face, and
the first portion has a length of 150 to 200 nm in a direction perpendicular to the front end face, and the second portion has a length of 2 to 80 nm in the direction perpendicular to the front end face.

9. The thermally-assisted magnetic recording head according to claim 8, wherein the end face of the second portion located in the front end face includes the near-field light generating part.

10. The thermally-assisted magnetic recording head according to claim 8, wherein the first portion is greater than the second portion in volume.

11. The thermally-assisted magnetic recording head according to claim 8, wherein the first metal material is one of Ag, Au, Al, and Cu.

12. The thermally-assisted magnetic recording head according to claim 8, wherein the second metal material has an ionization tendency lower than that of the first metal material.

13. The thermally-assisted magnetic recording head according to claim 8, wherein the second metal material has an electrical conductivity lower than that of the first metal material.

14. The thermally-assisted magnetic recording head according to claim 8, wherein the second metal material has a Vickers hardness higher than that of the first metal material.

* * * * *